United States Patent [19]

Caid et al.

[11] Patent Number: 5,619,709
[45] Date of Patent: Apr. 8, 1997

[54] SYSTEM AND METHOD OF CONTEXT VECTOR GENERATION AND RETRIEVAL

[75] Inventors: William R. Caid, San Diego; Pu Oing, La Costa, both of Calif.

[73] Assignee: HNC, Inc., San Diego, Calif.

[21] Appl. No.: 561,167

[22] Filed: Nov. 21, 1995

Related U.S. Application Data

[63] Continuation of Ser. No. 124,098, Sep. 20, 1993, abandoned.

[51] Int. Cl.[6] .............................. G06F 17/30; G06F 17/16
[52] U.S. Cl. ........................ 395/794; 395/602; 395/759
[58] Field of Search ........................ 364/419.19, 419.01, 364/419.08, 419.11, 419.13; 395/600, 650, 375

[56] References Cited

U.S. PATENT DOCUMENTS

| | | | |
|---|---|---|---|
| 4,730,259 | 3/1988 | Gallant | 364/513 |
| 4,949,250 | 8/1990 | Bhandarkar et al. | 395/375 |
| 5,008,812 | 4/1991 | Bhandarkar et al. | 395/375 |
| 5,043,867 | 8/1991 | Bhandarkar et al. | 395/375 |
| 5,113,521 | 5/1992 | McKeen et al. | 395/650 |
| 5,197,138 | 3/1993 | Hobbs et al. | 395/375 |
| 5,301,105 | 4/1994 | Cummings, Jr. | 364/401 |
| 5,317,507 | 5/1994 | Gallant | 364/419.13 |
| 5,325,298 | 6/1994 | Gallant | 364/419.19 |

OTHER PUBLICATIONS

Kwok, K.L., "A Neural Network for Probabilistic Information Retrieval", Proceedings of the Twelfth Annual International ACM SIGIR Conference on Research and Development in Information Retrieval, Jun. 25–28, 1989, pp. 21–30.

Turtle, H. and Croft, B., "Inference Networks for Document Retrieval", Proceedings of the 13th International Conference on Research and Development in Information Retrieval. Sep. 5–7, 1990, pp. 1–25.

Kimoto, H., "Construction of a Dynamic Thesaurus and Its Use for Associated Information Retrieval", Proceedings of the 13th International Conference on Research and Development in Information Retrieval, Sep. 5–7, 1990, pp. 227–240.

Egghe, L., "A New Method For Information Retrieval, Based On The Theory Of Relative Concentration", Proceedings of the 13th International Conference on Research and Development in Information Retrieval, Sep. 5–7, 1990, pp. 469–493.

*Primary Examiner*—Robert A. Weinhardt
*Assistant Examiner*—Joseph Thomas
*Attorney, Agent, or Firm*—Fenwick & West LLP

[57] ABSTRACT

A system and method for generating context vectors for use in storage and retrieval of documents and other information items. Context vectors represent conceptual relationships among information items by quantitative means. A neural network operates on a training corpus of records to develop relationship-based context vectors based on word proximity and co-importance using a technique of "windowed co-occurrence". Relationships among context vectors are deterministic, so that a context vector set has one logical solution, although it may have a plurality of physical solutions. No human knowledge, thesaurus, synonym list, knowledge base, or conceptual hierarchy, is required. Summary vectors of records may be clustered to reduce searching time, by forming a tree of clustered nodes. Once the context vectors are determined, records may be retrieved using a query interface that allows a user to specify content terms, Boolean terms, and/or document feedback. The present invention further facilitates visualization of textual information by translating context vectors into visual and graphical representations. Thus, a user can explore visual representations of meaning, and can apply human visual pattern recognition skills to document searches.

39 Claims, 21 Drawing Sheets

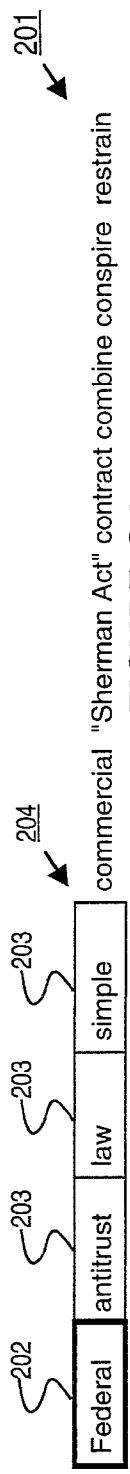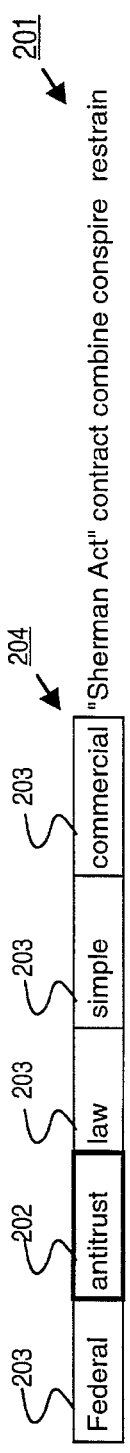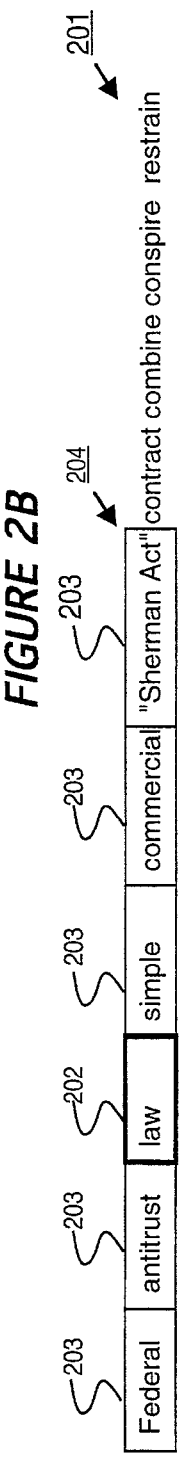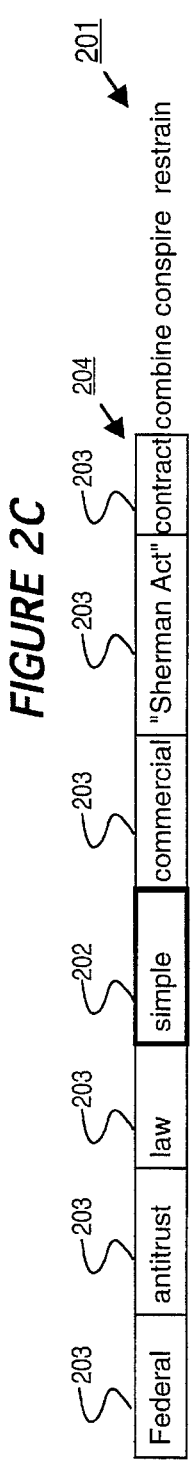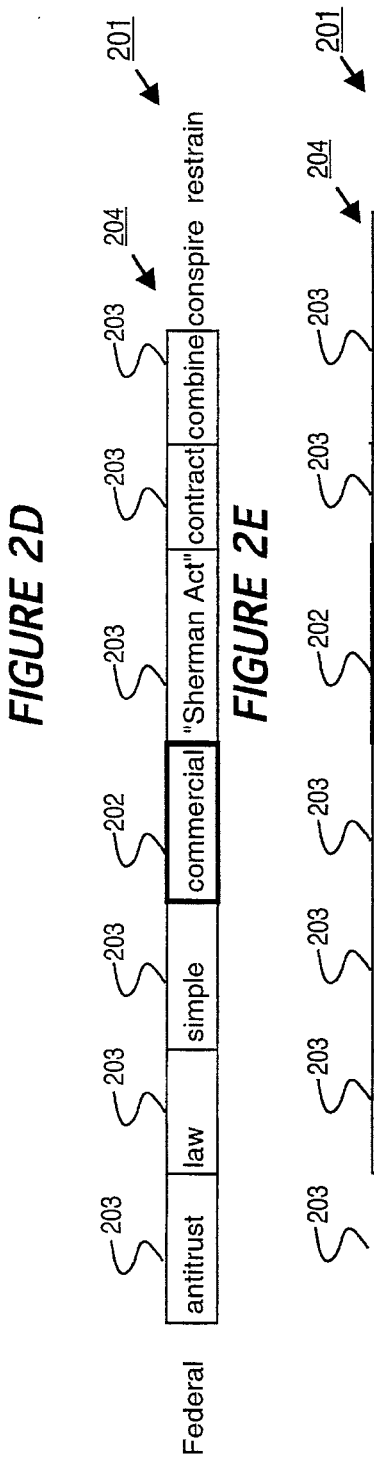
FIGURE 2A
FIGURE 2B
FIGURE 2C
FIGURE 2D
FIGURE 2E
FIGURE 2F Size: ○ ○ ○
Shape: ○ △ □
Color: ○ ◐ ●
Distortion: □ ▭ ○ ⬭
Orientation: □ ◇
Motion: • Rotation
• Vibration
• Periodic Routing Query Generation

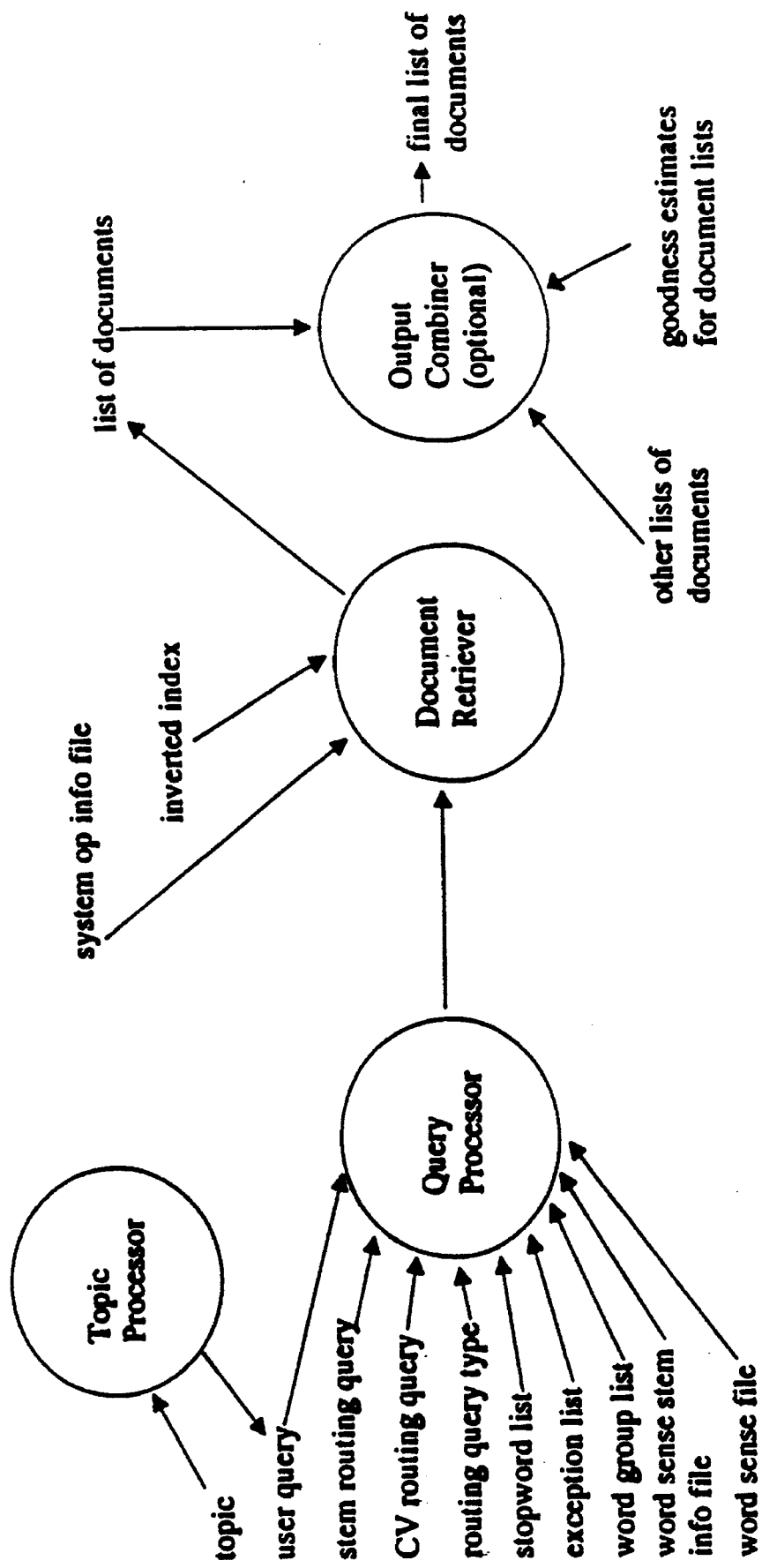
FIGURE 28 Retrieval

SYSTEM AND METHOD OF CONTEXT VECTOR GENERATION AND RETRIEVAL

RELATED APPLICATIONS

This is a continuation of prior application Ser. No. 08/124,098 filed on Sep. 20, 1993, now abandoned.

CROSS-REFERENCE TO RELATED APPLICATION

The subject matter of this application is related to the subject matter of pending U.S. Pat. No. 5,325,298, for "Method for Context Vector Generation for Use in Document Storage and Retrieval", by Stephen I. Gallant, filed Sep. 3, 1991, the disclosure of which is incorporated herein by reference.

BACKGROUND OF THE INVENTION

1. Field of the Invention

This invention relates to vector-based meaning-sensitive information storage and retrieval systems, and more particularly to an improved system and method for generating and retrieving context vectors that represent high-dimensional abstractions of information content.

2. Description of the Related Art

Conventional methods of record storage and retrieval generally involve storage of all records word for word and then searching for key words in the records using inverted indexes. The key word searches are performed by doing a complete search through all of the contents of the data base that contain a list of query words. Such systems have no knowledge, for example, that "car" and "automobile" represent nearly the same meaning, so the user must include this information by using a complex and difficult-to-formulate query. Some systems try to solve this problem by a built-in thesaurus, but such systems lack "meaning sensitivity" and miss many subtleties of meaning association, such as the fact that "car" is closer to "road" than to "hippopotamus".

There is currently much research and development in the field of neural networks. A neural network consists of a collection of cells and connections among cells, where every connection has an associated positive or negative number, called a weight or component value. Each cell employs a common rule to compute a unique output, which is then passed along connections to other cells. The particular connections and component values determine the behavior of the network when some specified "input" cells are initialized to a set of values. The component values play roughly the same role in determining neural network behavior as a program does in determining the behavior of a computer.

Prior art for document retrieval includes systems using variable length lists of terms as a representation, but without meaning sensitivity between terms. In such systems, pairs of terms are either synonyms or not synonyms.

So-called "vector space methods" can capture meaning sensitivity, but they require that the closeness of every pair of terms be known. For a typical full-scale system with over 100,000 terms, this would require about 5 billion relationships—an impractical amount of information to obtain and store.

Methods have also been proposed for searching with fixed-length vectors. However, such methods require work on the order of at least the square of the sum of the number of documents and the number of terms. This is impractical for a large corpus of documents or terms.

A document retrieval model based on neural networks and capturing some meaning sensitivity has been proposed. However, a search in such models requires multiplications for twice the product of the number of document and the number of keywords for each of a plurality of cycles.

Koll in "WEIRD: An Approach to Concept-Based Information Retrieval," *SIGIR Forum*, vol. 13, no. 4, Spring 1979, pp. 32–50, discloses a retrieval method using vector representations in Euclidean space. The kernel or core used by Koll are non-overlapping documents. This results in rather small dimensional vectors on the order of seven values. Vectors are generated from the core documents based on whether or not a term appears in a document. As an alternative, Koll suggests starting with a kernel of terms which never co-occur.

SUMMARY OF THE INVENTION

The present invention is directed to a system and method for generating context vectors for use in a document storage and retrieval system. A context vector is a fixed-length series of component values representative of meaning or content. Geometric relationships among context vectors are representative of conceptual relationships among their associated items. Thus, two information items having similar meaning or content have similarly-oriented context vectors, while items having dissimilar meaning or content have orthogonal context vectors. Similarity between items may be measured by calculating the dot product of the associated context vectors.

Context vectors may be associated with words, terms, documents, document portions, queries, images, quantitative data, people, or any other type of information item. This use of context vectors provides a context-sensitive information retrieval, routing, and visualization system based on learned similarity of meaning.

The present invention provides a context vector generation scheme that uses a neural network operating on a training corpus of records. Resulting vectors are relationship-based, formed by the proximity of words to one another in the training records. Relationships among context vectors are deterministic, so that a context vector set has one logical solution, although it may have a plurality of physical solutions. No human knowledge, thesaurus, synonym list, knowledge base, or conceptual hierarchy, is required.

Record storage according to the present invention is performed by inputting each record, which may be any type of information item, in machine-readable form into a processing system. If a record is textual in nature, uninteresting words may be removed from consideration prior to further processing. A learning law is then applied to each word (or analogous component) of the record, which assigns context vectors in accordance with word proximity. The learning law employs a technique of "windowed co-occurrence" wherein a fixed-size moving window is applied throughout the document, and words within the window (neighbor words) may exert "influence" on neighbor words in accordance with mutual co-importance. Such "influence" is constrained to avoid convergence, or collapse, of context vectors. Once context vectors are established for all components of a record, they are combined to form a summary vector for the record. This summary vector is then normalized. It represents the overall meaning or content of the record.

Summary vectors of records may be clustered to reduce searching time, by forming a tree of clustered nodes. A centroid is computed for each node based on the average of the normalized summary vectors within a defined group. Thus, records with similar information content occupy the same cluster. Information content of the cluster is represented by the centroid vector. The node tree may be traversed to provide a speedy method of locating relevant records in the data base.

Once the context vectors are determined, records may be retrieved using a query interface that allows a user to specify content terms, Boolean terms, and/or document feedback. The basic searching method involves converting the user's query into a context vector (a query vector). Queries may also be based on example documents, selected paragraphs, sentences, or words. The query vector is then combined with the normalized summary vectors (or with node centroids) to locate the records having the closest vectors. Retrieved records may be displayed in order of vector proximity, which corresponds to relative relevance to the query. Rank ordering by proximity prevents information overload to the user (unlike conventional Boolean search methods, where search results may include, for example, 500 documents, without any indication of which documents are likely to be the most relevant). In addition, the most relevant portions of retrieved records may be highlighted if desired.

The system may also employ relevance feedback, whereby the user specifies which of the retrieved documents are most helpful. A new search may then be performed using the summary vector for the specified documents. This technique reduces the time required for searches and improves system effectiveness.

Furthermore, the techniques of the present invention facilitate visualization of textual information by translating context vectors into visual and graphical representations. Thus, a user can explore visual representations of meaning, and can apply human visual pattern recognition skills to document searches.

Finally, the present invention provides a language-independent information representation scheme. Thus, it may be used to perform English queries on foreign text for retrieval (and vice versa) without the need for prior translation or interpretation.

BRIEF DESCRIPTION OF THE DRAWINGS

FIGS. 2A through 2F show an example of window definition.

FIG. 28 is a data flow diagram of retrieval in the MatchPlus system.

DESCRIPTION OF THE PREFERRED EMBODIMENTS

Figure 1A:
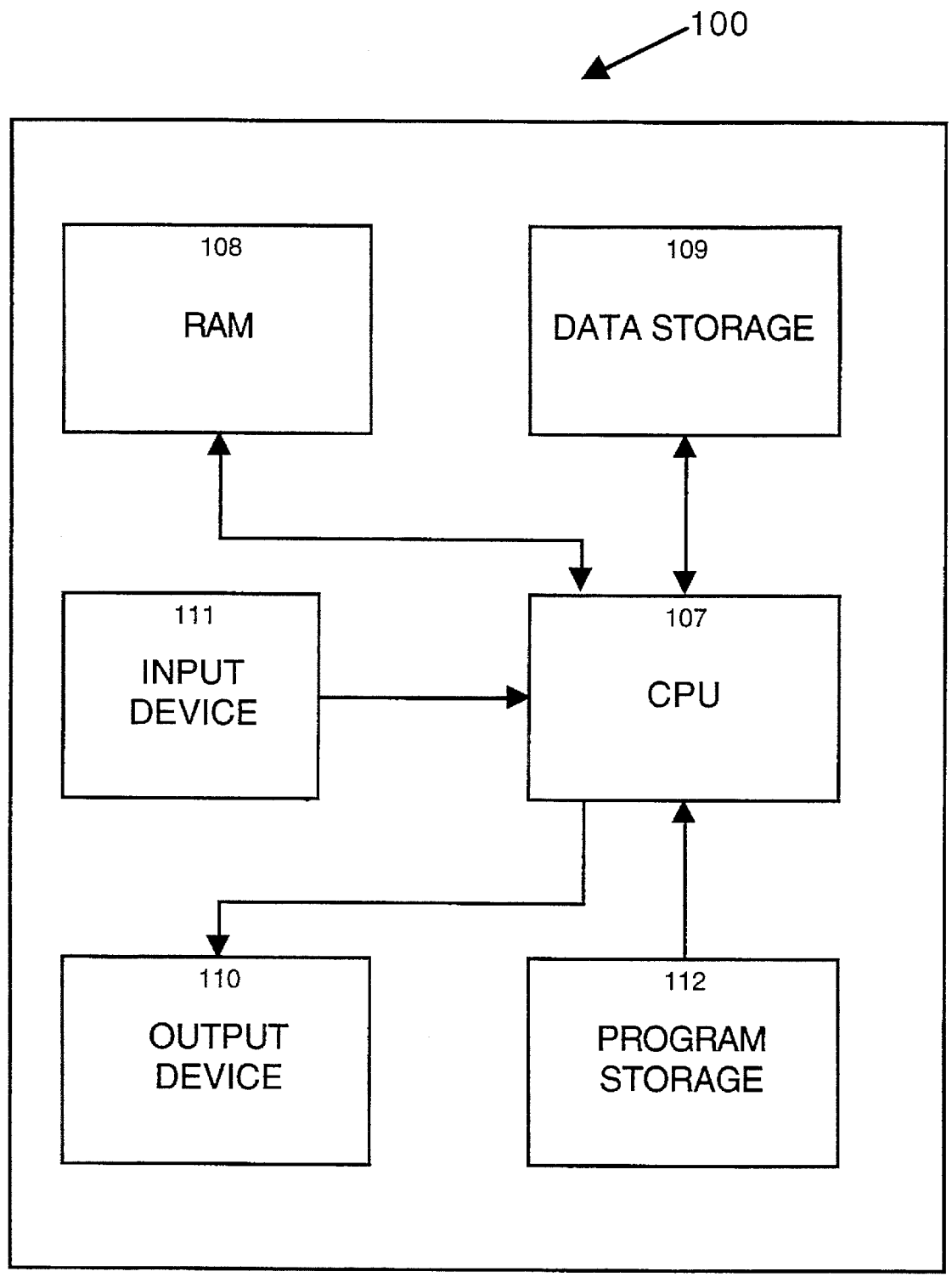
FIG. 1A is a block diagram of the hardware elements of the present invention.

Referring now to FIG. 1A, there is shown a block diagram of a typical implementation of a system 100 in accordance with the present invention. The user supplies queries to system 100 via input device 111. Central processing unit (CPU) 107 runs software program instructions, stored in program storage 112, which direct CPU 107 to perform the various functions of system 100. In the embodiment illustrated herein, the software program is written in the C programming language and runs under the UNIX operating system. Each of these languages may be run on a variety of conventional hardware platforms. Data storage 109 contains a corpus of documents, as well as data describing context vectors. Alternatively, the corpus of documents (or other information items) may be remotely located, with electronic links to system 100. In accordance with the software program instructions, CPU 107 accepts input from input device 111, accesses data storage 109, and uses RAM 108 in a conventional manner as a workspace. CPU 107, data storage 109, and program storage 112 operate together to provide a mechanism for generating context vectors and for retrieving information in response to queries.

In the embodiment illustrated herein, CPU 107 can be a mainframe computer or a powerful personal computer;

RAM 108 and data storage 109 are conventional RAM, ROM and disk storage devices for the CPU; and output device 110 is a conventional means for either printing retrieved information items, displaying the information on a video screen using a window-based interface system, or sending it to a database for later access.

The preferred embodiment of the present invention is capable of handling a very large corpus, containing over 10 million documents. The architecture supports operation in a distributed data/distributed processor environment, if desired. It may be implemented on any platform, operating system, and user interface of sufficient power and flexibility, such as: XWindows/MOTIF; Sun/OS SunView; Microsoft Windows, VAX/VMS, and the like.

The present invention is based upon a representation scheme using context vectors. A context vector is a fixed length vector having a plurality of component values that are determined based on relationships between meanings of information items. Such information items may be words, paragraphs, queries, documents, images, and the like. In the following discussion, for illustrative purposes, context vectors are described with reference to words and documents, although many other types of information items may be similarly represented. In the preferred embodiment, each context vector has 200 or more component values.

The context vector generation scheme of the present invention is designed to produce vectors that represent the relative proximity of meaning or content among words or documents in a quantitative, geometric manner. Thus, information items having similar meanings have closely aligned vectors, while information items having dissimilar meanings have orthogonal vectors. This representation scheme allows proximity of meaning to be assessed by performing a simple dot product (inner product) operation on associated context vectors; the higher the dot product result, the more similar the meanings.

Accordingly, the absolute orientation of a particular vector in the vector-space is irrelevant, as long as the relative orientation (with respect to other vectors) is representative of relative proximity of meaning and content. In other words, the problem of finding a set of vectors defining relative meaning has an infinite number of physical solutions in vector-space (absolute orientations) but only one logical solution (relative orientations). The context vector generation scheme of the present invention is designed to arrive at the logical solution through a deterministic training method, without regard to absolute orientation of the vectors themselves.

Context Vector Training

Figure 1B:
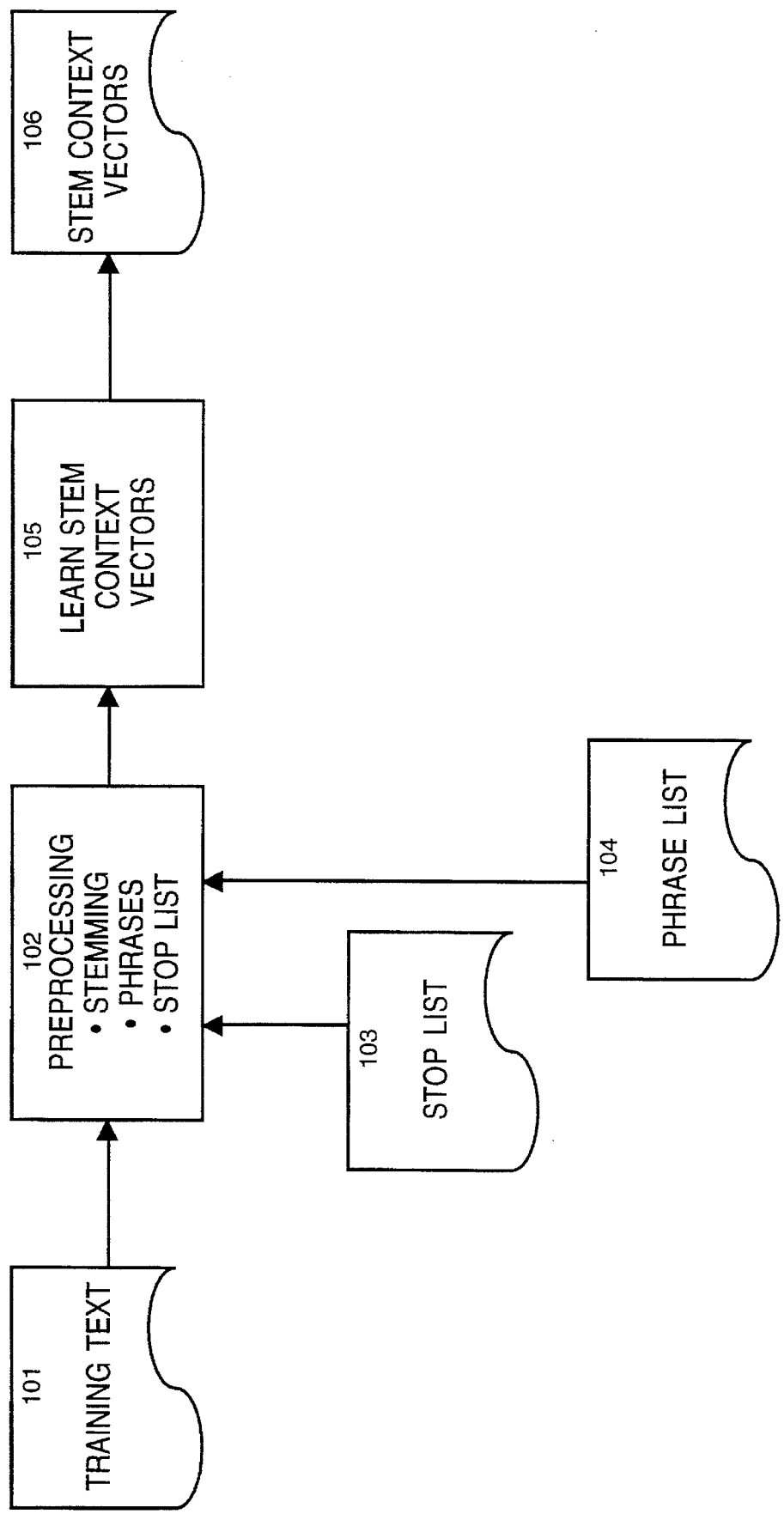
FIG. 1B is a block diagram of the training system of the present invention.

Context vectors are developed for individual words or terms based on proximity to other words. This learning technique is performed on a training set of documents. Referring now to FIG. 1B, there is shown a block diagram of the training system. A training text 101, stop list 103, and phrase list 104 are provided to a preprocessor 102. Training text 101 includes a set of documents for training. Stop list 103 includes a list of words that are deemed uninteresting and are not to be considered in training (e.g., prepositions and common words). Phrase list 104 includes a list of multiple-word phrases that are to be treated as a single word for training purposes (e.g., "world series", "golden parachute", "best man").

Figure 3:
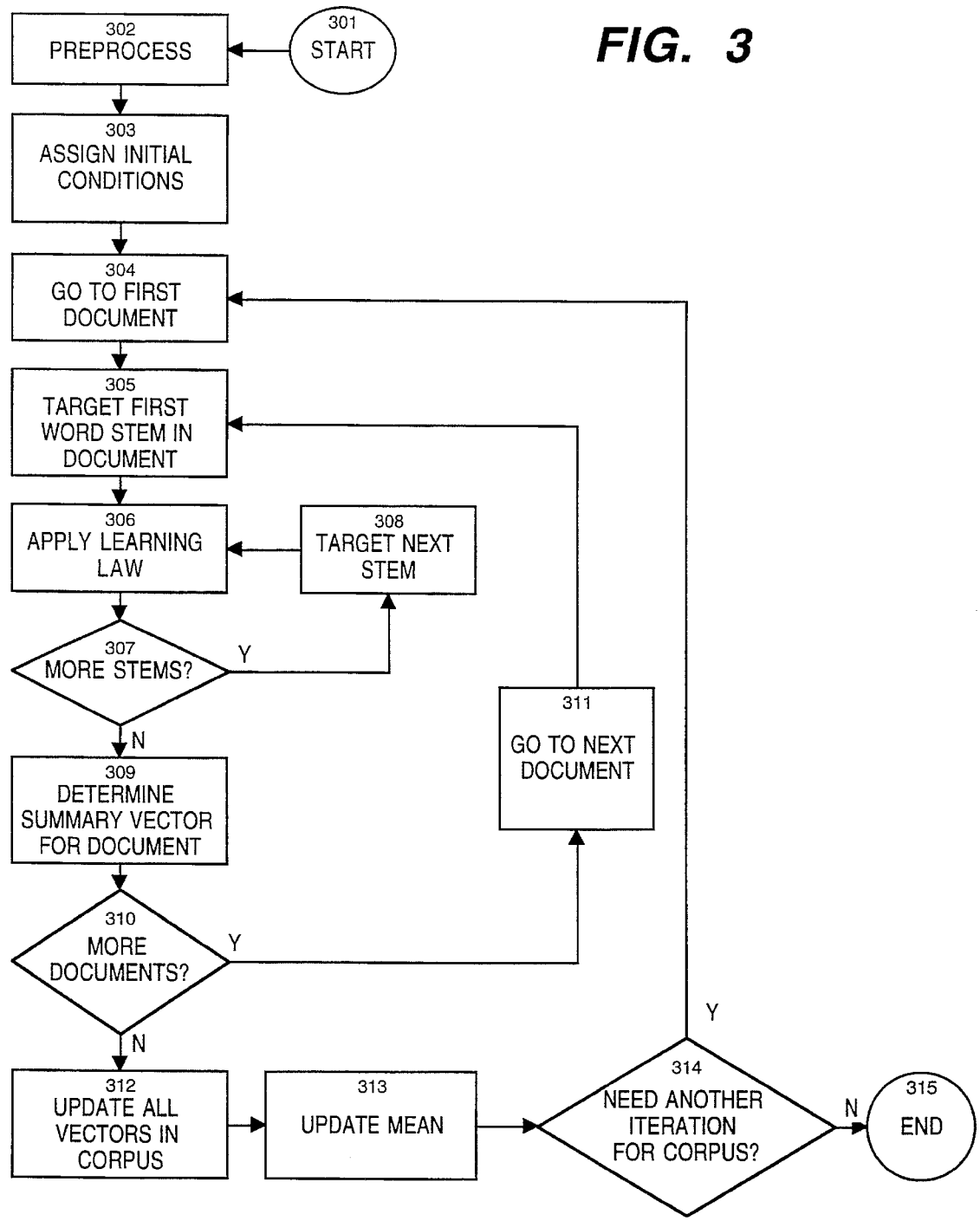
FIG. 3 is a flowchart of the training process of the present invention.

Referring now also to FIG. 3, there is shown a flowchart of the training process. The system starts by preprocessing the documents in the training set. Preprocessing consist of several steps, including: 1) removing stop-listed words from the set of training words; 2) consulting phrase list 104 to locate and mark multiple-word phrases that are to be treated as a single word; and 3) reducing words to "stems" in order to increase the effectiveness of the training process—thus, "investments", "investor", and "investing" share the stem "invest" and may be treated alike.

The set of word stems generated by preprocessor 102 is fed to learning system 105 which generates a set of stem context vectors 106 according to the method shown in FIG. 3. Each context vector consists of a fixed number of components (200 or more in the preferred embodiment).

Learning system 105 generates stem context vectors as follows. First, initial conditions are assigned 303. In the preferred embodiment, initial conditions are assigned by generating a random context vector for each stem, consisting of components selected by zero-mean, unit-variance Gaussian random number generation. Since the system uses dot products as the measure of relationship strength, mutual orthogonality is a desirable initial condition. This is due to the fact that near-orthogonal vectors will have dot products close to zero. This near-zero dot product corresponds to a weak initial relationship. Assigning a random context vector provides an initial condition that approximates mutual orthogonality. As will be recognized by those skilled in the art, other techniques of assigning initial conditions can be employed.

The system then starts with the first document 304 and proceeds through every document in the training corpus. For each document, it starts at the first word stem 305 and passes through the document, targeting each word stem, one by one. As each stem is targeted, the system applies 306 a learning law to the target. In the preferred embodiment, step 306 involves the following substeps. First, a window is defined, consisting of a fixed number of word stems appearing on either side of the target stem. In the preferred embodiment, the window includes three stems on each side of the target stem, although the window can be of any size. The stems within the defined window are called neighbors.

Referring now also to FIGS. 2A through 2F, there is shown an example of the window definition for the first few word stems 201 of a sample document. In FIG. 2A, the target stem 202 is "Federal" and the neighbor stems 203 are "antitrust", "law", and "simple". Window 204 only includes three neighbor stems 203 because there are no neighbors to the left of target 202 (since target 202 is the first word stem of the document). Next, as shown in FIG. 2B, the target stem 202 is "antitrust", and the neighbor stems 203 are "Federal", "law", "simple", and "commercial". FIGS. 2C, 2D, and 2E proceed similarly. FIG. 2F shows the more general case where window 204 includes three neighbors 203 on each side of target 202. (Note that "Sherman Act" is treated as a single word stem; this is defined in phrase list 104, discussed above).

For each target 202, context vectors of neighbors 203 are used to "influence" the context vector of target 202. The relative influence of each neighbor is weighted by two factors: 1) a function dependent on the neighbor's position in the window relative to the target, and 2) a frequency function determined by the number of documents containing the neighbor stem (frequency). The closer the neighbor, and the lower the frequency function, the more "influence" the neighbor has. These weighting techniques are described below.

The target vector $T_j$ of a target word j is updated using some sort of learning law. Several different learning laws have been developed, any of which may be used. In some learning laws, a weighted average of the neighbor context vectors is determined and then applied to the target vector $T_j$;

in other learning laws, the influence of neighbors is determined and applied individually. The most effective learning law has been found to be the following: An error $E_{ij}$ can be defined for each neighbor of the target word, representing the difference between the neighbor vector and the target vector. Thus:

$$E_{ij} = N_{ij} - T_j \qquad (Eq. 1)$$

where:

$N_{ij}$ is the context vector for neighbor i of target stem j; and
$T_j$ represents the context vector for target j.

A correction value $C_j$ for target j is determined using the formula:

$$C_j = \sum_i^{WS} (\|E_{ij}\| - \alpha_{ij})\hat{E}_{ij} \qquad (Eq. 2)$$

where:

WS is the window size in stems; and $\alpha$ is a proximity constraint that limits the correcting effect of each error vector $E_{ij}$ on the vector $T_j$ of target$_j$ according to a relationship between neighbor$_i$ and target$_j$.

If desired, a proximity weight for each neighbor may be applied in generating the correction value $C_j$. The proximity weight causes neighbor stems that are closer to the target to have a greater effect than those that are farther from the target.

The correction value is then applied to the target vector as follows:

$$T_j^{NEW} = T_j^{OLD} + \frac{\gamma}{F_j} \sum_{i=1}^{F_j} C_j - M \qquad (Eq. 3)$$

where:

$\gamma$ is a predefined step size, or learning rate;

$F_j$ is the total number of occurrences of stem j in the corpus; and

M is the mean context vector for all unique stem vectors in the corpus.

Although the above-described learning law has been found to be highly effective, alternative learning laws are herein presented for illustrative purposes. As will be apparent to those skilled in the art, other learning laws may also be applied.

One alternative operates as follows. First a weighted sum $W_j$ of the neighbor vectors for target j is determined using the formula:

$$W_j = \sum_i^{WS} \frac{G(i)}{D_j} N_{ij} \qquad (Eq. 4)$$

where:

G(i) is a Gaussian weight for the neighbor i; and $D_j$ is the number of documents that contain target stem j.

Thus, the weighted sum is inversely proportional to the number of documents that contain target stem j. The weighted sum $W_j$ is then added to the target vector as follows:

$$T_j^{NEW} = T_j^{OLD} + W_j \qquad (Eq. 5)$$

Another alternative learning law, known as a "batched normalized error" law, operates as follows: First the weighted sum calculated in Eq. 4 is used to determine a weighted error:

$$E_j = W_j - T_j \qquad (Eq. 6)$$

A correction value $C_j$ for target j is determined using the formula:

$$C_j = \sum_{i=1}^{F_j} E_j \qquad (Eq. 7)$$

Then the correction value is applied to the target vector as follows:

$$T_j^{NEW} = T_j^{OLD} + \gamma C_j - M \qquad (Eq. 8)$$

In Eq. 8, the weighted error is not normalized. Alternatively, it may be normalized, yielding the equation:

$$T_j^{NEW} = T_j^{OLD} + \gamma \hat{C}_j - M \qquad (Eq. 9)$$

One problem with these learning laws is that they may lead to collapse or convergence of the context vectors (overtraining) when multiple passes are attempted. The solution is to introduce constraints that prevent vectors from getting too close to one another. This was done in Eq. 2. The effect of a constraint is as follows. When the magnitude of the error vector is greater than $\alpha$, the target is moved towards its neighbors. When the magnitude of the error vector is less than $\alpha$, the target is moved away from its neighbors. Thus, convergence and collapse of the context vector set are avoided.

For effective training, $\alpha$ should be selected in accordance with the relative "importance" of the target and its neighbor. If two stems are "important" and they co-occur, then the learned relationship between them should be strong (i.e., the dot product of the two vectors should be large). Therefore $\alpha$ should be small, permitting the two vectors to get closer to each other. In order to vary $\alpha$ according to the importance of both the neighbor and the target, the following technique is employed.

Importance is determined by the frequency of occurrence of the stem in the corpus. The importance metric $I_j$ for stem j varies from a predefined lower bound B to 1.0:

$$B \leq I_j \leq 1.0 \qquad (Eq. 10)$$

Importance is determined by the equation:

$$I_j = B + (1 - B) \left( 1 - \frac{\log\left(\frac{1}{ND_j}\right)}{\log\left(\frac{1}{TND}\right)} \right) \qquad (Eq. 11)$$

where:

$ND_j$ is the number of documents that contain stem j; and
TND is the total number of documents in the corpus.

From this equation, it can be seen that a stem appearing in every document will have an importance equal to B, while a stem appearing in only one document will have an importance equal to 1.0. The greater the frequency of occurrence, the less important the stem.

The value of $\alpha$ for a particular pair of stems i and j is determined by the equation:

$$\alpha_{ij} = 1 - I_i I_j \qquad (Eq. 12)$$

Thus, the greater the co-importance of the two vectors, the smaller the value of $\alpha$. The value of $\alpha$ is bounded as follows:

$$0 \leq \alpha_{ij} \leq 1 - B^2 \qquad (Eq. 13)$$

It can be seen, therefore, that the value of $\alpha$ determines how close any neighbor vector can get to the target vector. The value of $\alpha$ determines the minimum angle between the two vectors, and thus the maximum dot product between them.

Referring again to FIG. 3, whichever learning law is used, the system then checks 307 to see whether there are more stems to be targeted in the current document. If so, it targets the next stem 308 and returns to step 306.

Figure 4:
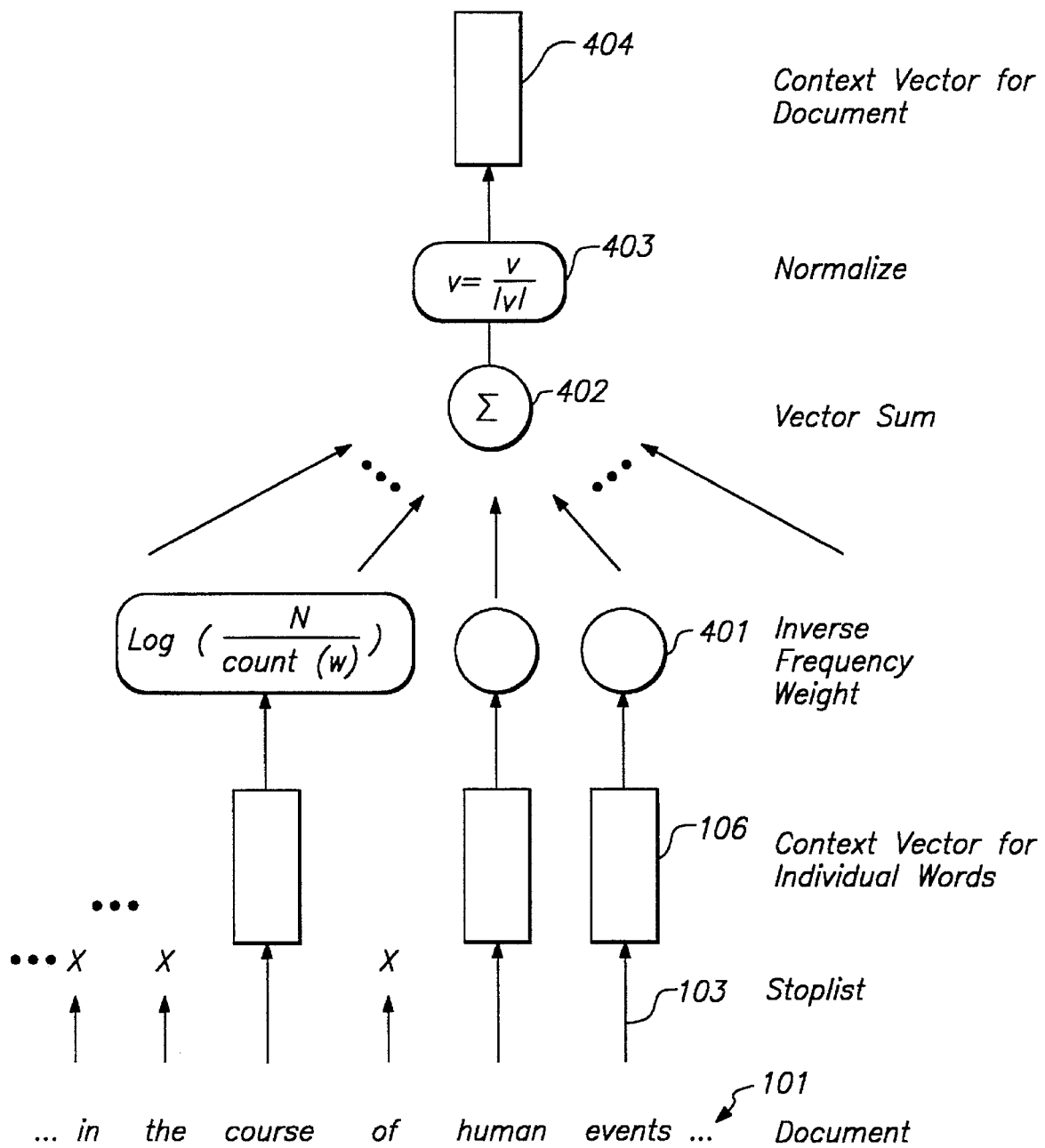
FIG. 4 is a block diagram of the process of determining a summary vector for a document.

Once the context vectors for all stems of the document have been targeted, the system determines 329 a summary vector for the document as a whole. This vector is representative of the overall content or meaning of the document. It may be generated by simply adding the context vectors of all the stems in the document and normalizing the result. Alternatively, stems may be weighted according to their frequency; the context vectors of stems that occur less frequently in the corpus as a whole are weighted more heavily when the summary vector for a document is calculated. Other techniques of determining a summary vector from a set of stem context vectors may also be employed. Referring now also to FIG. 4, there is shown a block diagram of the process of determining a summary vector for a document according to the preferred embodiment. Context vectors 106 are weighted according to an inverse frequency weight 401 and combined with a vector summing operation 402. The result is normalized 403 to produce a normalized summary vector 404.

Referring again to FIG. 3, if there are more documents to be processed, the system goes to the next document 311 and repeats steps 305 through 309.

Target vectors are not actually updated until the end of an iteration (one pass through the corpus). This prevents flip-flopping and unwanted feedback effects as vectors move towards their neighbors. All corrections are summed during the iteration and applied at iteration boundaries, in a vector update 312. After all targets $T_j$ are updated, the mean M is also updated 313.

The system then checks 314 whether additional iterations are required for the corpus. The number of iterations to be performed for a document depends upon some kind of predefined stopping criterion that may incorporate speed, stability, or other concerns. If additional iterations are required, the system returns to step 304.

As will be apparent to those skilled in the art, many variations on the above training techniques are possible, particularly where the training data are non-textual in nature (such as imagery, sound, video, and the like). For illustrative purposes, a more generalized description of a context vector generation technique is given in *Development of Context Vectors by Singular Value Decomposition*, below.

Context Vector Storage and Indexing

Once the summary vectors have been determined, they are stored. Storage of the normalized summary vectors can be arranged to further reduce searching time by creating cluster trees. An initial parent node at the top of the tree indexed as level 0, node 1, initially contains all of the normalized summary vectors in the data base. A series of child nodes each branching from the initial parent node is created at a next level of the cluster tree. A centroid-consistent clustering algorithm is used to distribute the summary vectors among the series of child nodes. A group of clusters is centroid-consistent if every member of every cluster belongs to the cluster in the group with the closest centroid. A centroid is determined by taking, for each dimension, an average of the component values from all of the context vectors within the group. One popular centroid-consistent clustering algorithm is convergent k-means clustering. Convergent k-means clustering can be performed as follows:

1. Begin with any initial partition that groups the vectors into k clusters. For example, take the first k summary vectors as single element clusters and set the initial value of the centroid of each cluster to equal its member vector. Assign each of the remaining summary vectors to the cluster having the nearest centroid. After each assignment, recompute the centroid for the cluster which gains a vector;

2. Take each summary vector in sequence and compute its distance from the centroid of each of the k-clusters. If the vector is not currently in the cluster with the closest centroid, move the vector to that cluster and update the centroids of the clusters that gain or lose a summary vector;

3. Repeat step 2 until convergence is achieved, that is until a pass through all of the summary vectors causes no new assignments.

Since convergence may be rather time-consuming to achieve, the clustering algorithm can be simplified by limiting the number of repetitions of step 2. After a given number of repetitions, such as 99, the centroids can be frozen. Then, one or more passes can be made through all of the summary vectors, distributing the vectors to appropriate clusters, but without updating the centroids. While, using this approximation, the centroids will no longer be exact centroids, the approximate centroids will be sufficient for the use of the present invention. It is not necessary to the present invention that the centroids be precise; however, it is preferable that the clusters be centroid-consistent. The last pass through the summary vectors guarantees that the clusters are centroid-consistent with the approximate centroids. From herein, "centroids" as used in this application shall mean approximate centroids—in other words, a centroid sufficient to establish centroid-consistent clusters. Each node is identified by its centroid for use in the searching process.

Alternatively, other centroid-consistent clustering algorithms may be employed. Such alternatives are described, for example, in "Self-Organized Formation of Topologically Correct Feature Map"; T. Kohonen, and in "Performance Evaluation of Self-Organized Map Based on N eural Equalizers in Dynamic Discrete—Signal Detection"; T. Kohonen, et al., and "The Self-Organizing Map", Tuevo Kohonen Proceeding of the IEEE, Vol. 78, No. 9, September, 1990, which are incorporated herein by reference.

In forming a next level of clusters, the nodes in the level above become parent nodes to a set of child nodes below. Only the summary vectors assigned to a parent node are used in the clustering algorithm to form the child nodes which branch from that parent. This is repeated across the entire level of parent nodes and on subsequent levels so that fewer and fewer context vectors are assigned to the child nodes on each lower level. The nodes form a tree pattern in which each node branches from a node in the level above. Thus, each summary vector is assigned to a node on each level of the cluster tree. Each node has a centroid. The bottom-level node assignments for each summary vector and the centroids for each node are stored for use in the search and retrieval algorithms. On the bottom level of the tree, each node points to each normalized summary vector assigned to it. The nodes on the bottom level may be referred to as buckets.

Once a cluster tree has been set up, it is a simple matter to add a new record summary vector to the tree. The initial branches of the tree are examined to find the closest centroid. The summary vector is assigned to the node with the closest centroid. Then, the branches from that node are examined for the closest child node centroid, and the process is continued until a bucket is reached. The new record is then assigned to the bucket with the closest centroid of those buckets branching from the node on the previous level to which the summary vector was assigned. The centroids themselves are not changed. This action preserves centroid-consistency of the clusters. If a bucket gets too large, the summary vectors on the bucket can be divided into subclusters on a subsequent level.

Retrieval

Figure 10:
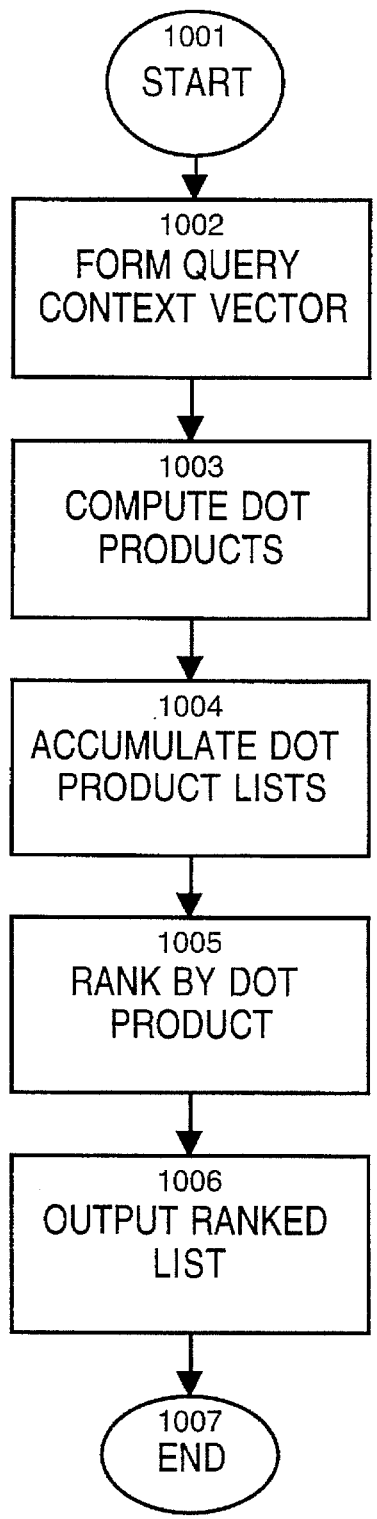
FIG. 10 is a flowchart of the retrieval method of the present invention.

Referring now to FIG. 10, retrieval of context vectors that have been stored according to the above-described tree technique proceeds as follows. The user makes an inquiry using a set of words or terms, or by specifying one or more records (or documents) for which similar records are sought. The words, terms, and records may be weighted if desired to designate which are most pertinent to the results being sought. After appropriate weighting, context vectors for the words, terms, and records are combined by addition to produce a single query vector 1002.

The query vector is then compared with each summary vector in the data base by performing a dot product vector operation 1003. Lists of these results are accumulated 1004, and the summary vectors resulting in the highest dot products are considered most relevant to the search. If desired, documents can be ranked 1005 in order of dot product magnitude to form a list indicating relevance. The ranked list is then output to the user 1006. Rank ordering by proximity prevents information overload to the user (unlike conventional Boolean search methods, where search results may include, for example, 500 documents, without any indication of which documents are likely to be the most relevant).

By using the above-described cluster tree storage mechanism, the searching task can be greatly accelerated. The query vector is used to identify the summary vector that is closest to the query vector (by dot product computation). The search is performed using a depth first tree walk. A branch is followed down the tree, taking the node at each level having the centroid closest to the query vector. The search proceeds down the tree until a bottom level node (bucket) without children is reached. Each of the summary vectors in the bucket is compared with the query vector (again by dot product computation) to identify the closest summary vector.

Before a subsequent node in the depth first tree walk is checked for a closest vector, first it is determined whether the node can be completely pruned. A node is pruned if it is not possible for a closer normalized summary vector to be assigned to the node than the closest normalized summary vector found so far without violating centroid-consistency. Suppose we are examining a node with centroid C' for pruning. If C is the centroid of any sibling node, then if it is true that any centroid closer to the query vector Q than V (closest vector found so far) must be closer to C than C', then we may prune the node with centroid C' as well as any nodes branching therefrom, This may be computed by comparing the distance between C and C' with twice the sum of the distance between C and Q and the distance between Q and V. If the distance between C and C' is greater, then the node with centroid C' (and its descendants) may be pruned. If not, the formula is repeated for the remaining sibling nodes, since any one of them may permit pruning to proceed. If none of the sibling nodes achieve pruning of the node, then the search continues through the node with centroid C' and down into the subsequent level if there is one. By using the pruning formula, a node can be pruned when any vector closer to the query vector than the closest vector V must be closer to the centroid C than to the centroid C'. Therefore, that vector could not be assigned to node C or else it would violate centroid-consistency. If this is a bottom node, then all of the summary vectors on the node must be checked to determine whether any are closer than the closest vector found so far. If a closer summary vector is found, it will then become the closest summary vector being remembered. Thus, bottom nodes are thoroughly searched if not pruned. The search continues in a depth first tree walk, pruning off entire branches when possible. These searches continue through the tree until all branches have either been checked or pruned. After the entire tree has been searched, the closest summary vector has been identified. The record associated with the summary vector can be retrieved.

Other known techniques for node pruning, including linear programming techniques, may also be employed.

The system may also employ relevance feedback, whereby the user specifies which of the retrieved documents are most helpful. A new search may then be performed using the summary vector for the specified documents. This technique reduces the time required for searches and improves system effectiveness.

In addition, the most relevant portions of retrieved records may be highlighted if desired. This is done by dividing each retrieved records into a number of sections, representing chapters, paragraphs, or other components. A summary vector is generated for each section, based on the word stems in that section. Dot product computation of the section summary vectors with the query vector is then performed to isolate those sections that are most relevant to the query. The selected sections are then displayed using some distinguishing visual attribute (bold, larger type, a different font or color, an enclosing box, and the like). Thus, the user is able to quickly locate the portions of the document that are most relevant to the query.

One of the possible applications of the above-described system is in the area of conventional ICD9 codes that are commonly used to describe medical procedures. For example, context vectors could be developed to represent medical procedures and their associated ICD9 codes. Then, when additional information is needed for a medical procedure, a query vector could be formulated to retrieve procedures and codes that are relevant to the current procedure.

Another application of the information retrieval system described above is the automated coding of text documents according to a defined index of terms. For example, the Wall Street Journal uses an index of approximately 150 terms to code each article. These terms are assigned by human editors. The information retrieval system described above can be used to emulate the performance of the human editor in assigning such index terms, in the following manner:

1. Build context vectors for words using a sample of text.
2. Collect a set of documents that have been indexed by human "experts" (e.g., editors in the case of the Wall Street Journal), called the indexed collection, and generate context vectors for these documents.
3. Generate a context vector for the new document to be automatically indexed.
4. Compare the context vector of the new document with the context vectors of all documents in the indexed collection, and identify the best matches (perhaps the 10 best matches).
5. Produce a list of the index terms of each of the best matches and assign a weight to each term that is proportional to the degree of match such that better matching indexed documents have larger weights than indexed documents that have do not match as well.
6. For each unique index term, generate the index term score by adding the weights of each occurrence of that index term in each of the best matching index documents.

7. Sort the list of unique index terms according to the index term score and assign to the new document those index terms at the top of the list.

See HNC MatchPlus Functional Specification section below, which provides a functional specification, including module and data format descriptions, for a preferred context vector generation, storage, and retrieval system according to the present invention.

Document Visualization

Another useful application of stored summary vectors is in the area of visualization of document content. Context vectors provide a mechanism by which meaning and content of documents can be represented in a visual form, allowing a human observer to take advantage of visually-oriented pattern recognition skills to find documents that are of interest.

Once vectors have been established using the above-described methods, they can be represented visually using any of a number of techniques. The preferred embodiment provides a color graphics visual representation of a set of documents on a computer screen, such as a color graphics workstation or a PC or PS/2 computer equipped with a graphics board. It operates using software written in the C programming language and runs under the UNIX operating system. Essentially, the summary vectors for documents and other information items are displayed in a pseudo-orthogonal display having axes corresponding to query terms (the query terms need not actually be orthogonal to one another). In addition, the items may be displayed with visual attributes representing relative similarity of meaning with other query terms.

Figure 11:
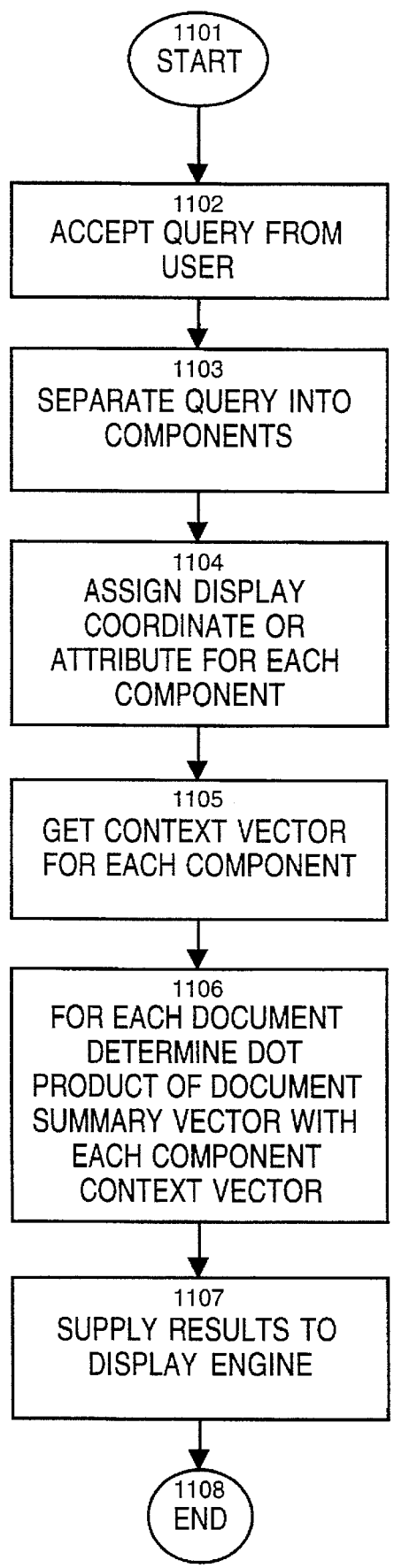
FIG. 11 is a flowchart of a method for document visualization.

Referring now to FIG. 11, there is shown a flowchart of the method of document visualization of the present invention. The method is described with regard to documents, although it may be applied to any type of information items. First, the system accepts 1102 a query from the user. This query may be in the form of a word, term, phrase, document, or other form, as discussed above. Then, the query is separated 1103 into a number of components. This separation may be performed manually by the user, or some automated means may be used, to generate components that maximize information content for the display. For example, query components may be selected in alignment with the principal components of the document set covariance matrix. These are obtained by considering the data object's context vectors as points in feature space. These points form a cloud, with one point for each object. Principal component analysis fits the best-fitting ellipsoid to this cloud, based on root-mean-squared analysis. Query terms corresponding to the longest perpendicular principal axes of this ellipsoid are selected as the principal components of the data set.

For each component, a display coordinate (axis) or visual attribute is assigned 1104. For example, if five components are identified, the first three may be assigned to the X,Y, and Z axes, and the remaining two may be assigned to the visual attributes of color and texture. Any number of axes and attributes (including visual and non-visual attributes) may be identified and assigned to components, although an excess of axes or attributes may lead to a confusing display.

A context vector is determined for each query component 1105 by the method previously described. Then, for each document to be represented in the display, a set of dot products is computed 1106 using the summary vector of the document with the context vector for each query component. The resulting set of dot product results for each document specifies coordinates and visual attributes for a representation of that document. Once such information has been developed for all documents to be displayed, the results are supplied 1107 to a display engine capable of on-screen display of the icons. Thus, a set of icons are shown on a display screen, having on-screen positions and attributes corresponding to the dot product results.

The display engine may employ known artificial reality image generation technology to portray each document as a three-dimensional icon with a specific shape, size, color, texture and movement projected into a higher dimension context vector space, in accordance with the dot product results previously determined. In addition, coded information about a document (such as the author or the date of publication) can also be represented.

Many variations on the above-described visualization scheme are possible. If desired, the above technique may be employed using only display coordinates; all icons will then be displayed having uniform visual attributes. Alternatively, icons having visual attributes such as color, size, and the like, could be displayed without using a positioning scheme. Thus, a relatively compact display could be generated, without a need for high-powered processors to generate the artificial reality display described above. In one embodiment, each icon contains one or more small images of thermometers, each thermometer indicating the degree of correlation (dot product result) with a particular concept.

The display engine of the preferred embodiment is a high-level graphics software interface such as the Programmer's Hierarchical Interactive Graphics System (PHIGS). Other display engines may be used as well. PHIGS and other systems are described below, as well as in the following publications which are incorporated herein by reference: Hill, F. S., *Computer Graphics*, Macmillan, New York, 1990; Kessener, L. R. A., *Data Structures for Raster Graphics*, Springer-Verlag, Berlin, 1985; Foley, J. D., and van Dam, *Fundamentals of Interactive Computer Graphics*, Addison-Wesley, Reading, Mass., 1983.

The description of a three-dimensional scene used as input to PHIGS is simply the definition of each individual object to be displayed, expressed as a set of linked polygons located in a fixed 3-dimensional coordinate system, with each polygon having specified light reflectivity properties (color, specularity, texture, etc.). The polygons make up the visible exterior surfaces of the objects to be displayed. PHIGS handles the lighting of the objects and the calculation of their appearance to the user from a particular vantage point.

The use of such visual display techniques allows a user to view large groups of documents simultaneously in a multi-attribute space. The display of the present invention simultaneously shows the user all of the attributes of each data object for a large set of data objects.

Figure 5:
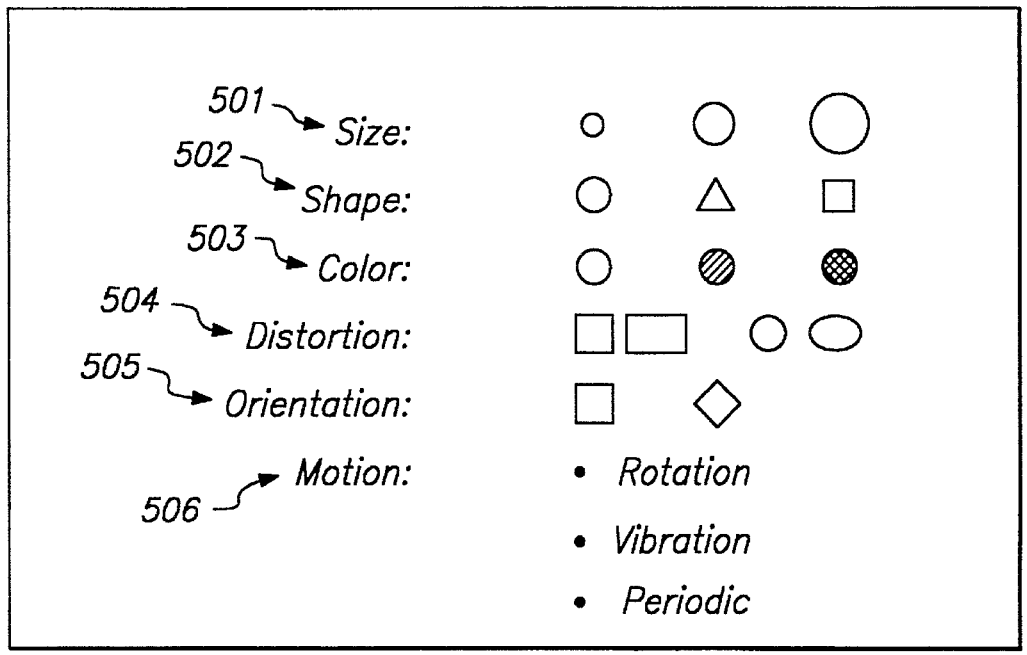
FIG. 5 shows sample icon attributes.

Referring now to FIG. 5, there is shown a set of examples of six different visual attributes 501–506 for icons: size 501, shape 502, color 503, distortion 504, orientation 505, and motion 506. Many other examples are possible, including additional visual characteristics as well as sound.

Figure 6:
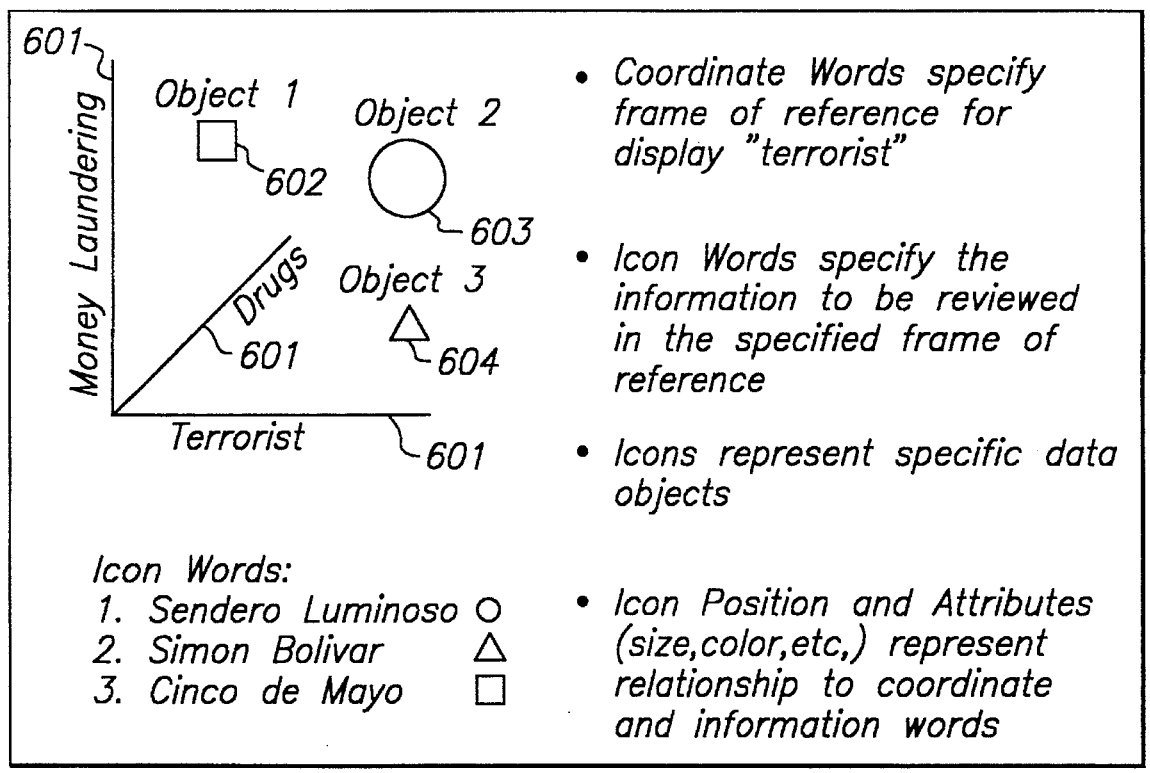
FIG. 6 is a sample display for document visualization.
Figure 9A:
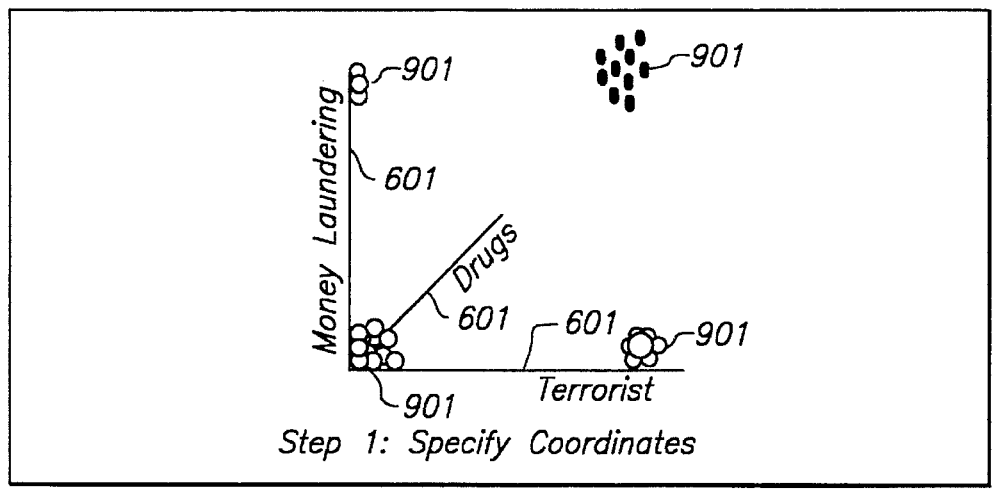
FIG. 9A is a sample display for document visualization.

Referring now to FIG. 6, there is shown a sample display having three axes 601, corresponding to the terms "money laundering," "drugs," and "terrorist." Referring now to FIG. 9A, there is shown a sample display with axes 601 and clusters of icons 901 positioned in the coordinate space defined by axes 601.

Figure 7:
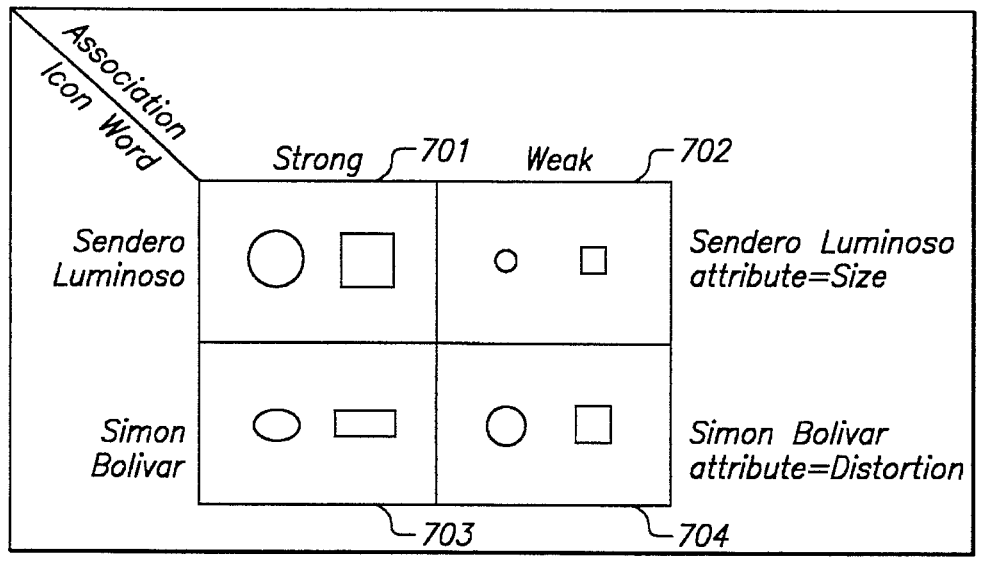
FIG. 7 shows examples of icons representing associations.

Referring now to FIG. 7, there is shown an example of icon display. In this example, the user has specified two icon words: "Sendero Luminoso", having the attribute of size; and "Simon Bolivar", having the attribute of distortion. Thus, large icons as shown in box 701 indicate a strong association with Sendero Luminoso, while small icons as shown in box 702 indicate a weak association with Sendero Luminoso. Similarly, distorted icons as shown in box 703 indicate a strong association with Simon Bolivar, while undistorted icons as shown in box 704 indicate a weak association with Simon Bolivar.

In the present invention, each individually resolvable icon is portrayed as an easily identified object in its proper position, and possessing its assigned attributes. Icons are displayed in simulated three-dimensional space, perspective, and hidden line removal. By means of simple mouse commands, the user is able to navigate through the three-dimensional projection of the higher dimensional context vector space. A user-selected window is available to show the entire vector space, as well as the position and orientation of the user's current viewpoint. The position and orientation can be changed in response to user commands. These operations are performed using conventional computer graphics and artificial reality techniques.

Figure 8:
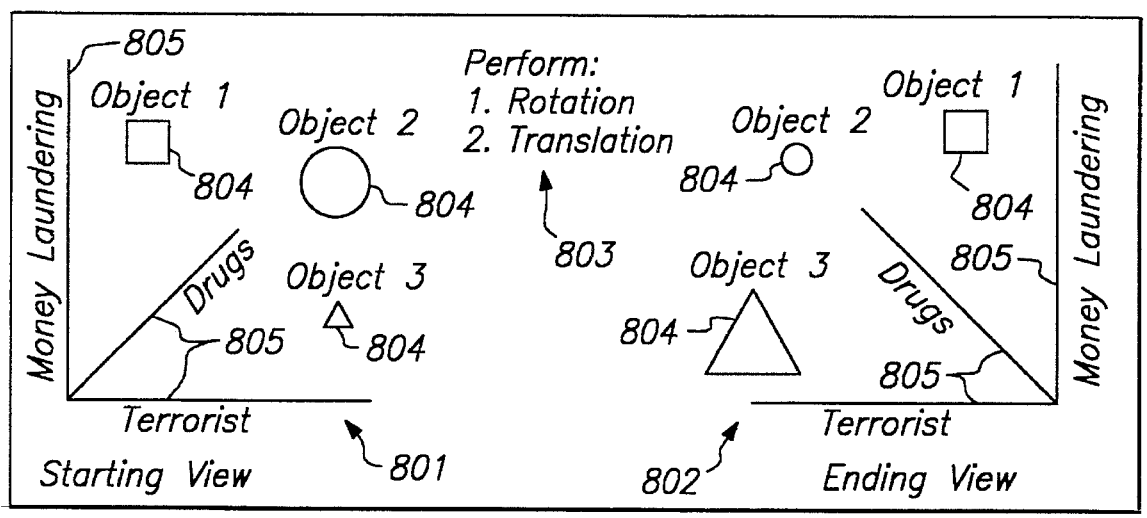
FIG. 8 shows an example of user navigation through vector space.

Referring now to FIG. 8, there is shown an example of user navigation. Starting view 801 includes three objects 804 positioned with respect to three axes 805. The user selects two operations 803, a rotation and a translation, resulting in ending view 802. In ending view 802, axes 805 have moved, and objects 804 have been repositioned accordingly.

When an icon is located at too great a distance from the user's position to accurately represent all of its characteristics, it will be shown as a point of light. If a large number of icons are located close to one another, they may be shown as a cloud or a shaded region.

Figure 9B:
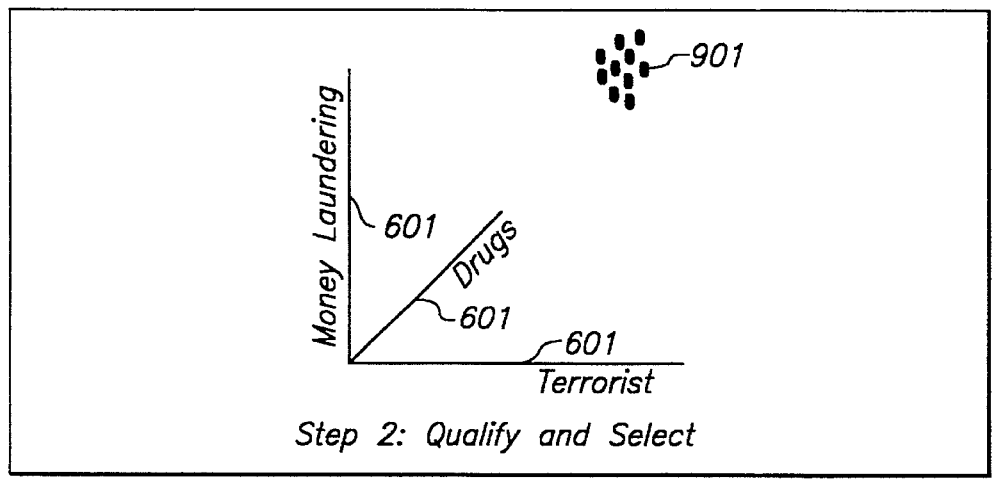
FIG. 9B is a sample display showing icon qualification.

If desired, the user may specify data object qualification parameters to help reduce visual clutter and information overload. One method of qualification is to allow the user to specify Boolean parameters, and only display icons which match the specified parameters. Alternatively, the display may be limited to the top-ranked documents resulting from a context vector query performed as described above. Referring now to FIG. 9B, there is shown an example containing axes 601 and one cluster 901 of icons that has been qualified. Other icons outside cluster 901 are not displayed.

Another way to reduce information overload is to provide hierarchical organization of the icons. The user selects an icon for examination of subordinate objects, and specifies a "zoom in" command. When the system zooms in on an icon, all icons representing other documents are erased from the display. New "sub-icons" are introduced, representing sections, chapters, and/or paragraphs of the selected document. These sub-icons are displayed in the same manner as icons.

Figure 9C:
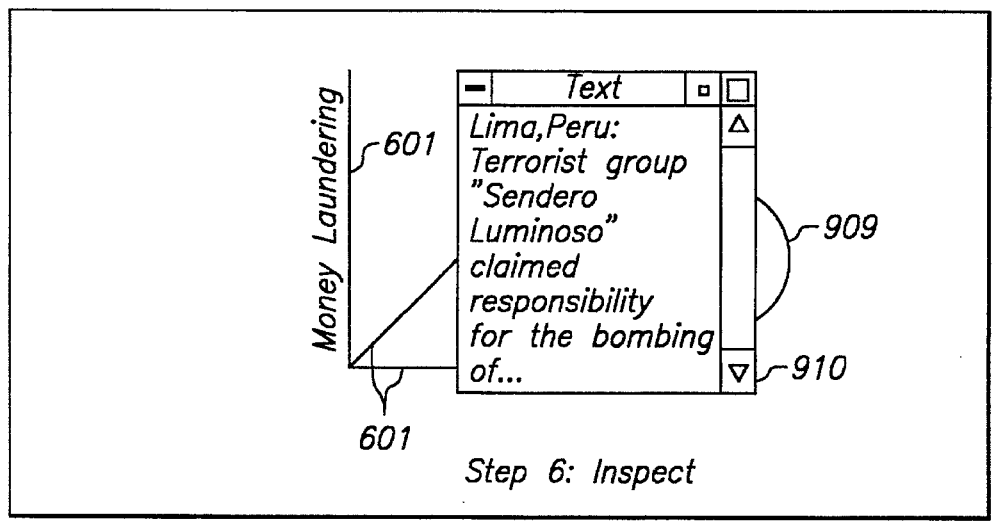
FIG. 9C is a sample display showing an open icon.

Responsive to some command, such as a double-click, associated with one of the icons or sub-icons, the associated document (or portion of a document) may be displayed for perusal by the user. Referring now to FIG. 9C, there is shown an example of a text window 910 superimposed on a display having axes 601 and an icon 909. Window 910 contains the text of the document associated with icon 909. The user can move or scroll, adjust window size, and close the window as desired, using conventional window manipulation techniques.

From the above description, it will be apparent that the invention disclosed herein provides novel and advantageous systems and methods for context vector generation and retrieval. The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

Development of Context Vectors™ by Singular Value Decomposition

A NEW APPROACH TO BUILDING MUTUAL SIMILARITY OF USAGE RELATIONSHIP REPRESENTATIONS

1. Introduction

Context vectors (see the next section for details) are a new and powerful approach to the representation of mutual similarity of usage (and/or meaning) between objects in a large data corpus. Context vectors are being used for document retrieval and routing and for visualization of the contents of groups of documents.

Beyond these proven uses, it is also believed that context vectors can be used for retrieval and routing of foreign language databases and for the construction of content-addressable image, sound, and video databases. Applications of context vectors to the detection and localization of interactions between outlaws (e.g., international criminals, gangs, and terrorists) are also being considered.

The technical approach discussed here builds upon a number of existing concepts, ideas, and results. We have combined and improved upon these important past works to achieve something qualitatively greater. However, at least two critical elements of our approach are entirely new—namely, the idea of context vectors and the observation that proximate co-occurrence is cognitively central to human mental association, and therefore applicable to the assessment of similarity of usage or meaning for almost all raw data—text, imagery, sound, video, etc.—see Section 2 for details.

This White Paper addresses a new possible method for generating context vectors much more efficiently and more accurately than the current method allows. This new method employs principal component analysis, implemented using Singular Valued Decomposition (SVD) and other related techniques.

To provide background for the discussion to follow, the context vector concept is defined and explained in the next section. Following this, Sections 3 through 6 discuss the proposed SVD core context vector generation method and its application to text retrieval and routing. Section 7 discusses the use of context vectors in building a multi-language text retrieval and routing system.

2. Context Vectors

In this section the concept of a set of context vectors is defined. This definition is general and can be applied to text, imagery, sound, and video.

The fundamental idea behind the context vector concept is the observation that many large bodies of real-world data have the property that the statistics of proximal co-occurrence of their basic elements are fixed. Further, frequent proximal co-occurrence of two basic elements can, in almost all cases, be interpreted as implying a strong similarity of usage or "meaning" between these elements. For example, in all human languages, in both spoken and written form (here basic elements are words), elements that frequently appear near one another have a strong associational linkage that could be called "similarity of usage or meaning". Similarly, still or video image elements that frequently appear near one another (with "near" taking on a spatiotemporal meaning in the case of video) can also be taken to have a similarity of usage or meaning. The utility of these observations for data retrieval and routing probably stems from the fact that the associations formed by the human mind are themselves derived, at least in large measure, by training processes driven by common proximal co-occurrence (although, of course, many other things are learned about such data as well). In effect, proximal co-occurrence can be viewed as a first-order approximation to the associational processing of the human mind. What has been discovered during the TIPSTER Program work is that this first-order approximation may be more than sufficient for carrying out high-performance retrieval and routing.

Context vectors are the quantifications of the statistics of proximal co-occurrence. We now define them.

We assume the existence of a large data set (text, imagery, sound, video, etc.). By large it is meant that if the statistics of the structures we will study are determined using a (randomly chosen) sizable subset of the database that these statistics will not, with very high probability, change significantly if re-measured on the whole data set.

We assume that our data set is densely endowed with what we will call elements, each of which belongs to one of N classes. For example, in text, the elements are words that belong to a designated lexicon (other words are ignored). Each lexicon word in the database belongs to one of N classes (stems). In imagery, the elements might be the objects designated by an automated attentional focusing system. These elements would each be assigned to a single class (where the classes are self-defined as distinct "clusters" of range/azimuth/elevation/background—insensitive feature vectors).

For convenience, we will assume that each element A in the database is numbered with a unique integer index i. We will refer to the $i^{th}$ element of the database as $A_i$. The number of the class to which $A_i$ belongs will be denoted by $c_i$, where $1 \leq c_i \leq N$. The set of indices of all elements belonging to class K, $1 \leq K \leq N$, will be denoted by $S_K$.

Each time an element appears in the database other elements typically appear "near" it. For example, when the word context appears in this document the word vector often appears next to it. It is these proximate co-occurrences that we exploit. To carry out this exploitation we must be given co-occurrence examples. Each such co-occurrence example consists of a base element $A_i$ along with a set of other elements found in close proximity to $A_i$. For each such proximal element $A_j$ in a co-occurrence example with base element $A_i$ a proximity weighting $d_{ij}$ is defined. The proximity weighting lies between 0 and 1, with greater weights representing greater proximity or nearness. Note that each database element can appear as the base element in at most one co-occurrence example. Some elements may not appear as base element any co-occurrence examples because we might not have all possible co-occurrence examples available to us. Finally, if we are given a co-occurrence example with base element $A_i$ in which $A_j$ appears with proximity weighting $d_{ij}$, then we assume that we will also be given a co-occurrence example with base element $A_j$ in which $A_i$ appears with the same proximity weighting $d_{ji}=d_{ij}$. In other words, we assume that proximity weightings are symmetric.

Given a large set of co-occurrence examples, we then form the square mutual co-occurrence matrix $R=(r_{uv})$, where:

$$r_{uv}=\text{AVERAGE}[d_{ij}|d_{ij}\neq 0 \text{ and } i \in S_u \text{ and } j \in S_v],$$

with the avenges being taken over all co-occurrence examples available for training the system. Note that since we have assumed that for each $d_{ij}$ we have an equal $d_{ji}$ in the training examples, R is automatically symmetric. Also note that since $d_{ii}$ can be assumed to be 1 (each element co-occurs with itself with proximity weighting 1), that R has its diagonal elements all equal to 1. To support the work that follows we note that because R will typically be very sparse and because almost all of the off-diagonal elements will be less than 1, it is not unreasonable to make the following assumption:

Assumption 1: The matrix R is assumed to be positive definite.

As shown by Strang [20], this is equivalent to saying that the determinants of the upper-left, diagonal-centered square submatrices of R all have positive determinants. This can normally be expected to be true in the cases of text sound, imagery, and video (and can be tested for any specific R).

Given the above preliminaries, we are now ready to define context vectors.

Definition 1: A set of vectors $$\{w_1, w_2, \ldots, w_N\} \subset R^n,$$

where n is an integer with n>>1, is called a set of context vectors for a data set mutual co-occurrence matrix R iff $$w_i \cdot w_j = r_{ij}$$

for all i, j=1, 2, ..., N.

The meaning of this definition is that the context vectors (which are all unit-length vectors, since $w_i \cdot w_i = r_{ii} = 1$) have directions that represent the mutual co-occurrences of the element classes. Note that since the $w_i$ are unit vectors that $w_i \cdot w_j = r_{ij} = \cos(\theta_{ij})$, where $\theta_{ij}$ is the angle between $w_i$ and $w_j$. As mentioned above, the context vectors encode the relative usage or, in some crude sense, the relative meaning of the element classes. Note that if we were to rigidly rotate the entire context vector set in $R^n$ that we would get an equivalent set of context vectors (since it is only the mutual angles between the vectors that matter). Thus, context vectors are not unique. This definition is currently a trade secret of HNC, Inc.

Now that we have precisely defined what a context vector is, some questions arise. First and foremost, given a mutual co-occurrence matrix R, do a set of context vectors exist? Another question is: given R, can we create a set of context vectors from it? Finally, how small can n be? These are some of the questions we examine in the next two sections.

3. Context Vectors Exist And Can Be Constructed

Given a mutual co-occurrence matrix R it is easy to show that a set of context vectors must exist for it.

Theorem 1: Given a symmetric, positive definite mutual co-occurrence matrix R, there exists a set of context vectors in $R^N$ for it.

Proof: If we define the N×N matrix W to be $$W=[w_1, w_2, \ldots, w_N],$$

where the N×1 $w_k$ vectors are the columns of W, then the condition that the context vectors must meet (from Definition 1) can be re-expressed as $$W^T W = R.$$

Thus, we must show that there exists such a matrix W. To do this all we need note is that since R is symmetric and positive definite we can use Gauss decomposition to reexpress this matrix as $$R = QDQ^T,$$

where the columns of the orthogonal matrix Q are the unit-length eigenvectors of R and the matrix D is diagonal, with the eigenvalues of R as its diagonal entries (see Strang [20] for details). If we then take the square root matrix of D (namely, the matrix $D^{1/2}$ which has each of its diagonal elements equal to the square root of the corresponding diagonal element of D) and rearrange terms we get $$R = QDQ^T = QD^{1/2}D^{1/2}Q^T = (D^{1/2}Q^T)^T(D^{1/2}Q^T).$$

Thus, we can take W to be $D^{1/2}Q^T$. Thus, for any symmetric, positive definite R there exists a W in $R^N$.

The upshot of Theorem 1 is that if we are willing to let n=N (which, for most applications, will be a very high dimensional space), then we can always find a set of context vectors in $R^N$, no matter what R is. Namely, all we need to do is calculate the eigenvalues and eigenvectors of R and then use them to construct $W = D^{1/2}Q^T$. While this indeed gives us a set of context vectors, they are not really ones that we want. Constructing desirable sets of context vectors in $R^n$, where n<<N is the subject of the next section.

4. SVD Construction of Practical Context Vectors

While the formula $W = D^{1/2}Q^T$ for constructing context vectors will work, it essentially leaves us stuck with using N dimensions for representing these vectors. For a practical application this would typically be a debilitating disadvantage in terms of computer memory and computational burden. For example, in a text data access system we might have N=250,000 (the number of stems in the corpus). In this section we demonstrate a method for producing context vectors in a (typically) much lower dimensional space that can perform approximately as well as "full-dimensional" context vectors. In fact, we provide a formula for calculating the error induced by reducing the context vectors to n dimensions from N dimensions.

The basic idea is to employ the Singular Value Decomposition (SVD—see Strang [20] for details) in which any arbitrary M×N matrix S can be written as $$S = PD^{1/2}Q^T,$$

where P is an M×M orthogonal matrix (with columns given by the unit-length eigenvectors of $S^TS$), Q is an N×N orthogonal matrix (with columns given by the unit-length eigenvectors of $SS^T$), and $D^{1/2}$ is an M×N matrix with the square roots of the r non-zero eigenvalues of $S^TS$ (and $SS^T$!—they have the same non-zero eigenvalues, all of which are positive and real) as the entries in its upper left "diagonal" and with zeros in all other positions. The orders of the eigenvectors in P and Q must match the order of the corresponding eigenvalues in D. Note that the SVD is not unique (for example, we can rearrange the orders of the eigenvalues and eigenvectors in D, P, and Q). From now on we will arrange D so that the eigenvalues are listed from largest to smallest, starting with the largest eigenvalue at the upper left corner of the matrix and moving down the diagonal to the right In our case we will be interested in applying the SVD to yield a lower-dimensional set of context vectors from our matrix R. To do this, we first note that the SVD expansion depends only on the properties of the matrices $S^TS$ and $SS^T$. Since we want $W^TW = R$, and since R is symmetric, we can identify R with both $S^TS$ and $SS^T$. Thus, the eigenvectors of $S^TS$ and $SS^T$ will be the same. So, in this SVD case, we will have P=Q. Thus, we can write W as $$W = QD^{1/2}Q^T,$$

with Q and D taking on the same meaning as in the previous section. It may seem odd that this construction of a W is so close to, and yet clearly different from, that provided by Theorem 1. However, as we noted above, W is by no means unique. To see that this SVD-derived W is indeed acceptable, note that $$W^TW = (QD^{1/2}Q^T)^TQD^{1/2}Q^T = QD^{1/2}Q^TQD^{1/2}Q^T = QDQ^T = R,$$

where we have exploited the property that $Q^TQ = QQ^T = I$ (the identity) for any orthogonal matrix.

The value of using $W = QD^{1/2}Q^T$ instead of $W = D^{1/2}Q^T$ becomes clear when we expand this new W in terms of the columns of Q. To make the notation clearer, we let $$Q = [u_{ij}] = [u_1, u_2, \ldots, u_N],$$

where the N×1 vectors $u_k$ (the unit-length eigenvectors of R) are the columns of Q. Using $W = QD^{1/2}Q^T$ we can then write $$w_i = \sum_{j=1}^{N} (\lambda_j^{1/2} u_{ij}) u_j = \sum_{j=1}^{N} \alpha_{ij} u_j,$$

where the (necessarily non-negative and real) eigenvalues $\lambda_1, \lambda_2, \ldots$ are listed in descending order. By virtue of this formula, we can see that each $w_i$ vector is expressed as a weighted sum of a fixed set of N vectors (the $u_j$). Because of the nature of the matrix R, it is reasonable to expect that many of its eigenvalues $\lambda_j$ will be close to zero. This is true of almost all real-world matrices constructed in a like manner, and we certainly expect it to be true in this case (see below for some experimental results supporting this supposition). Because of this, and because the $u_{ij}$ values are all small (recall that Q is orthogonal, and thus the $u_{ij}$ are the components of unit vectors), the $\alpha_{ij}$ scalar coefficients multiplying the $u_j$ vectors in the $w_i$ sum become progressively smaller as j increases (regardless of which particular $w_i$ vector we are considering). Thus, it may be reasonable to truncate these sums after r terms, where 1<r<N. In this case we get the approximation $$w_i \approx \sum_{j=1}^{r} \alpha_{ij} u_j.$$

Note that the $u_j$ vectors are an orthonormal basis for $R^N$. However, we have now discarded all but r of them. So this is an orthogonal basis for $R^r$. Thus, we can think of our $w_i$ vectors as belonging to an r-dimensional Euclidean space. If we reexpress our $w_i$ vectors in terms of the $u_j$ basis vectors (i.e., taking the first coordinate of this new representation to be the $u_1$ component, the second to be the $u_2$ component, and so on) we get $$w_i \approx ((\alpha_{i1}, \alpha_{i2}, \ldots, \alpha_{ir})^T \equiv v_i.$$

The error introduced by using these r-dimensional approximations $v_i$ can be quantified. Specifically, the errors in the inner products will be given by $$|w_i \cdot w_j - v_i \cdot v_j| = \sum_{k=r+1}^{N} \alpha_{ik} \alpha_{jk}.$$

In conclusion, we have shown that a set of lower-dimensional context vectors can be constructed by applying the SVD to the mutual co-occurrence matrix R. The error introduced into the context vectors by reducing the dimension from n=N to n=r is quantifiable and can be controlled as required by the specific problem.

5. Applicability of the SVD Method

The first question that naturally arises in connection with the SVD method proposed above is how rapidly the eigenvalues of the co-occurrence matrix R actually fall off in a real-world situation. This will determine both the practical dimensionality of the context vectors and the utility of the SVD method. This question is at least partially answered by FIGS. 12 and 13. These figures were created by calculating the eigenvalues of the matrix $$T = W W^T,$$

where, in this case, the W matrix is defined by a set of context vectors obtained using our current random-initialization and bootstrapping context vector generation method (the columns of W are the context vectors). As is well known, the matrices $W W^T$ and $W^T W$ have the same non-zero eigenvalues. However, $W^T W$ is an N×N matrix (where N is the number of stems—approximately 15,000 in these examples), whereas $W W^T$ is an n×n matrix, where n is the dimension of the context vectors (n equals 280 and 512 in the examples of FIGS. 12 and 13, respectively). Therefore, we calculated $T = W W^T$.

Figure 12:
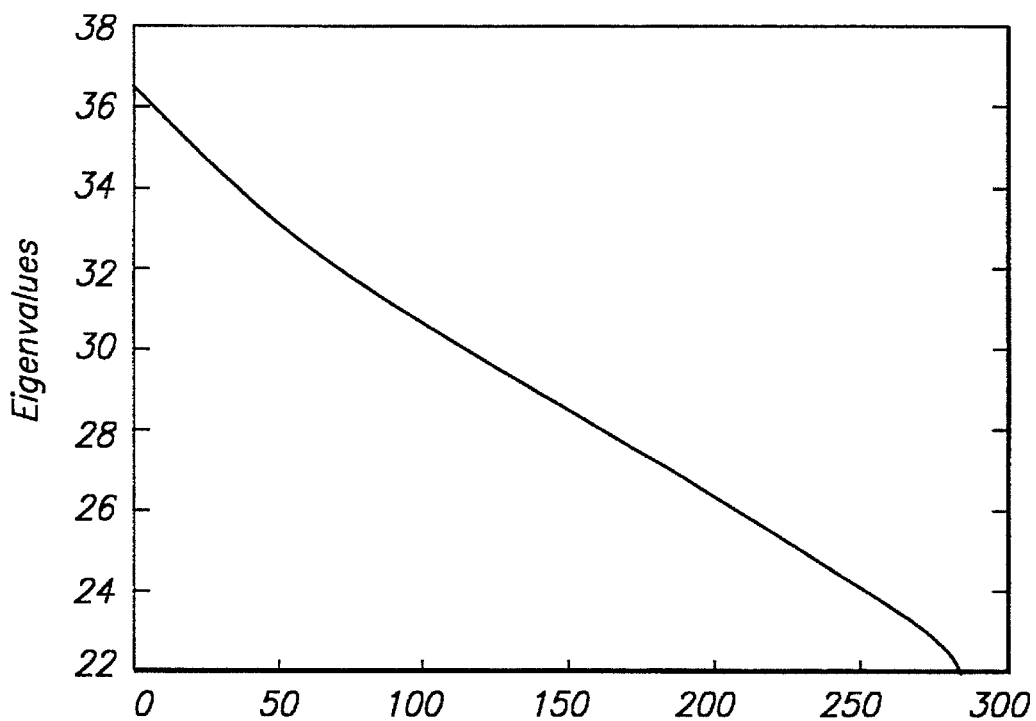
FIG. 12 is a chart of ranked eigenvalues derived from a set of approximately 15,000 280-dimensional context vectors.

FIG. 12 Ranked eigenvalues (largest on the left to smallest on the right) for $T = W W^T$ derived from a set of approximately 15,000 280-dimensional context vectors (i.e., N≈15,000 and n=280). Note that the smallest eigenvalues are not much smaller than the largest eigenvalues. This suggests that the dimensionality of this context vector space cannot be reduced further (perhaps increasing the dimensionality would improve somewhat).

Figure 13:
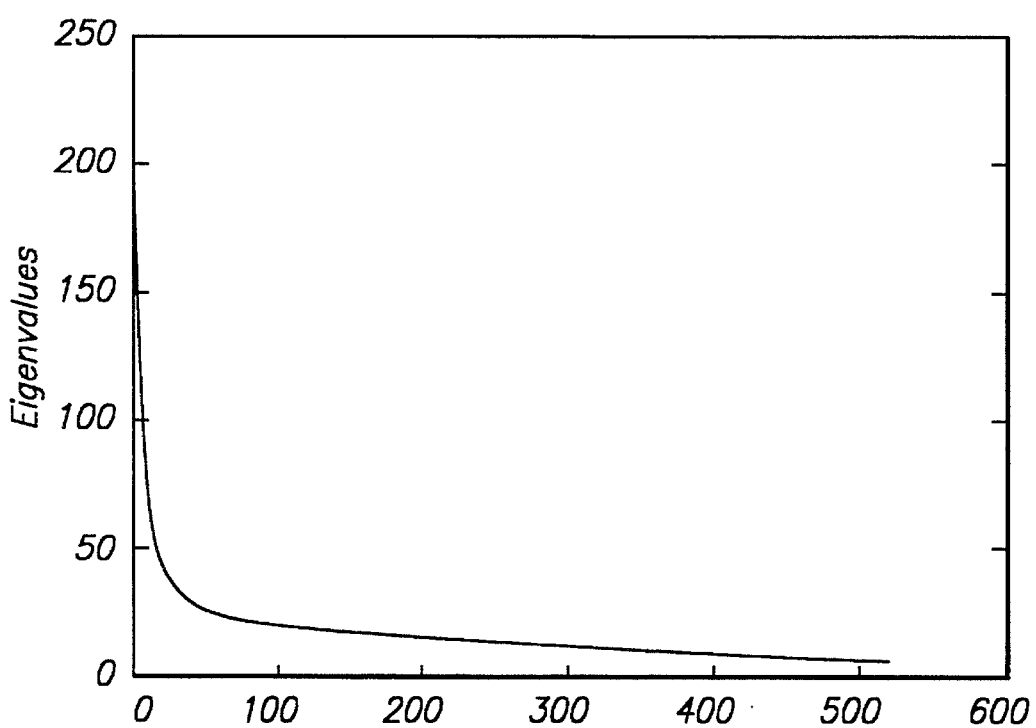
FIG. 13 is a chart of ranked eigenvalues derived from a set of approximately 15,000 512-dimensional context vectors.

FIG. 13 Ranked eigenvalues (largest on the left to smallest on the right) for $T = W W^T$ derived from a set of approximately 15,000 512-dimensional context vectors (i.e., N≈15,000 and n=512). Note that, unlike the case of FIG. 12, the smallest eigenvalues are much smaller than the largest eigenvalues. This suggests that the context vectors for this case could be adequately represented in a lower-dimensional space.

To see the effect of changing n on the eigenvalues of T we generated two sets of context vectors: one set for n=280 and one set with n=512. Once the context vectors were built (using a 1,000 document test corpus of Wall Street Journal articles from the TIPSTER collection) we then formed the matrix T, calculated its eigenvalues, and plotted them from largest to smallest. The results for n=280 and n=512 are shown in FIGS. 12 and 13, respectively. Clearly, for n=512 we see that the space can be reduced somewhat in dimensionality using the SVD method. Thus, we anticipate that the SVD method will be of use in developing sets of context vectors with the smallest possible dimensionality, without reducing the dimensionality too much (as in the n=280 case of FIG. 12. For most text data access applications we believe that context vectors with dimensionalities between 400 and 1000 will be adequate.

We now consider the value of the SVD method for applications of context vectors.

6. Practical Context Vector Generation Using SVD

The main incentive for developing an SVD method for context vector generation is that it will enable us to rapidly build highly accurate context vectors for a core set of element classes. These context vectors can then be used with a two-pass bootstrapping method to build the context vectors for all remaining element classes. By core set it is meant that there often exists a set of high-frequency-of-appearance elements that can be used as the foundation for the context vectors for the remainder of the classes. For example, in text we might choose, say 2,000 high-frequency stems to use as a core class set. We would then use a very large corpus to compute the mutual co-occurrence matrix for this core class set (R would be a 2,000×2,000 matrix). The SVD method would then be used to create a reduced-dimensionality set of context vectors from this R matrix.

The benefit of this method over the current initial random context vector/bootstrapping method is that only one pass through the data set would be required to build an excellent set of core context vectors. Further, since the co-occurrence matrix need only concentrate on the specific classes found in the core set, the number of calculations required during the one pass through the data is greatly reduced (as opposed to the current method, where all of the class context vectors must be adjusted during each of multiple passes through the data). This will allow the SVD method to use a much larger data set in the construction of the R matrix—thus yielding more accurate context vectors.

Once the R matrix is formed, it will be necessary to apply the SVD method to it. Since R will be a large, sparse, symmetric, positive semi-definite matrix we will apply special numerical techniques for this process. A number of these have been developed. For example, Professor Martin Schultz of Yale University has developed a large library of software subroutines for this purpose (they are sold by Scientific Computing Associates, Inc.). His software has been used to calculate the eigenvalues and eigenvectors for matrices of the above kind with dimensions as high as 100,000×100,000.

Once the eigenvalues of R have been calculated we will then use a set of rules to determine where to set the dimensionalities of the context vectors. The context vectors for the core classes will then be created.

Another possible approach to the SVD method is to use an adaptive neural network method for developing the eigenvalues and eigenvectors of the R matrix. This method has shown great promise, as it allows calculation of these quantities with typically greatly reduced computational burden, when compared with the algorithmic methods discussed above (see [1, 2, 3, 7, 10,11] for details on these neural network SVD methods). The primary reason for this reduction is that the R matrix does not have to be computed. These methods work by passing through the data itself. However, these methods will have to be adapted to this application, as our requirements are quite different from those of other applications that have used these methods (e.g., data compression and grammar analysis).

At least two different approaches to building a complete set of context vectors can be tried using the above core context vector generation procedure. One approach is to simply let the core set include almost all the classes. For example, in a typical corpus of approximately 1 million newspaper articles there would be approximately 40,000 stems which would appear more than 10 times in the corpus. If we restricted this to stems which appear 100 or more times this number would be reduced to roughly 10,000. It may be feasible to directly compute the R matrix for these classes and carry out SVD on it. The remaining stems (about 1 million, approximately 75% of which appear only once each) can then have their context vectors computed by adding up the weighted core context vectors in their co-occurrence sets during a single pass through the corpus. In this case, we believe that the SVD method will provide an excellent set of context vectors that have their mutual geometric relationships arranged exactly as dictated by the data itself.

Another approach to the development of a complete set of context vectors is to use a much smaller core set (e.g., the 2,000 highest frequency stems in the case of the TIPSTER corpus). Once the core context vectors have been created, they will be frozen. These core context vectors will then be used to determine the other class context vectors. Two passes of the batch bootstrapping method will be used. The first bootstrapping pass through the training data will be used to collect weighted sums of core context vectors for each co-occurrence set which contains a sufficient number of core context vectors. Those non-core classes that have sufficient numbers of co-occurrence sets will have their context vectors fixed at the end of this pass. A subsequent second pass will most likely be sufficient to calculate the context vectors of the remainder of the classes. It may be desirable to then go back and complete one more pass to readjust the core and first-pass context vectors based upon the second pass results. This method requires three passes through the data, but lowers the size requirement for the core class set.

Both of these SVD context vector generation methods are expected to be much more efficient and accurate than the current random initialization plus bootstrapping method. Significant improvements in retrieval and routing performance are expected from this new method of context vector generation.

7. Context Vectors for Foreign Language Text

One of the pressing needs in data access for text is to be able to retrieve and route documents in all languages that discuss a particular topic described in a single language query. HNC has devised a specific method for solving this problem using context vectors. This method is described in the this section using the example of a corpus containing documents in both English and Spanish.

The first step is to build (or adopt from another system) a set of context vectors for the English portion of the corpus. A person who is skilled in both languages in then engaged. Their job is to create a list of tie words, which are words that have the exact same meaning in both languages. In informal discussions with persons who know both English and Spanish, English and Russian. English and Chinese, and English and Japanese it is clear that it is easy to produce tie word lists having hundreds of entries for each of these language pairs. With effort, lists of at least two thousand tie words could probably be produced. We presume that this will be possible for any two human languages. To make this process simple, all tie words would be between English and the foreign language (in the case of this section. Spanish). This would seem reasonable because English is arguably the richest human language and it is also second in worldwide popularity (behind Chinese).

Once the tie words have been selected, their context vectors in English are looked up. These are then transferred to the context vector set for the corresponding words in the foreign language. These tie word context vectors are then frozen. The remainder of the context vectors for the language (a stop list and a stemmer can be used, if desired, but we do not believe that these are all that beneficial) are then created, using, for example, a neural network SVD method that adaptively builds new context vectors using the frozen tie word context vectors as a substrate. The final result is a set of context vectors for the foreign language that lie in the same context space as the English context vectors.

Key Point: Context Space is a universal meaning representation domain that we expect will be usable for representing the meaning of essentially all human data items (text in all languages, speech in all languages, imagery, and video).

Once the context vectors for the new foreign language have been built then the documents in that language have context vectors built for them and these are logged into the context space database.

In essence, context space becomes a crude universal method of describing the usage or meaning of a data item. The same space is used for all languages (and, eventually, for video, imagery, and sound as well). By means of quires expressed as vectors in this universal context space we can retrieve data in all languages and media on the basis of its content. When finally built, this will be the ultimate content addressable memory system.

To retrieve or route documents in multiple languages requires no new mechanisms. A query in one of the available languages is first formulated (the machine must be told which language it is). This query is then convened to a context vector. The context vector is then used to search through the document context vector database to find the closest matches, which are then presented in rank order (Boolean queries can also be used, but the key words will only be used with documents in the language from which they come—which must be specified). The net result is a list of the most relevant documents, independent of language. The user can then select which documents they care to look at and they will be displayed in the text window of the system.

In the case of a English and Spanish system, several advantages combine to make such a system much easier to build than, say, an English and Japanese system. First, significant volumes of Spanish text are available on CD-ROM. Second, the characters used in Spanish already exist within our Match Plus™ system. Third, many expert speakers of both English and Spanish are readily available to us. For these reasons, we believe that it will be possible to build an English and Spanish system.

Another potential advantage of having a common context space for all languages is that it will probably also be possible to build a crude gisting system. The idea of this would be that a foreign language document would be displayed in a text windows. The user would call up a gisting feature (by using a keyboard control sequence or by means of a mouse-activated menu selection). The gisting feature would place a window approximately one paragraph long in the text. Next to this window (to the side of the highlighted text in the window) would be a second window containing a selection of English words that have context vectors closely aligned with the aggregate context vector of the material in the foreign language window (which would be computed automatically by the gisting system). The English words in the gisting window would be presented in order of closeness to the context vector of the foreign language window. Although they would not be formed into sentences, we believe that these words would nonetheless give a very clear idea of the content of the selected passage. The user could then scroll the gisting window up and down the foreign language text to survey its content. Further, the existing Match Plus highlighting system could be used to locate those passages of the text that are most highly related to the subject mane of the query currently presented in the query window. In the end, we believe that this gisting window feature will, in many cases, obviate the need for translation of what are later recognized as irrelevant documents into English. This is yet another analyst productivity enhancement that we expect to flow from context vector technology.

REFERENCES

1. Almeida, L. B., and Silva, F. M., "Adaptive decorrelation", in: Aleksander, I., and Taylor, J. [Eds.] Artificial Neural Networks, 2, 149–156, Elsevier, Amsterdam, 1992.

2. Baldi, P., and Hornik, K., "Neural networks and principal component analysis: Learning from examples without local minima", *Neural Networks*, 2, 53–58, 1989.

3. Cottrell, G. W., Munro, P., and Zipser, D., "Learning internal representations from grey-scale images: An example of extensional programming", *Proc. Ninth Annual Conf. Cog. Sci. Soc.,* Seattle, Erlbaum, Hillsdale N.J., 1987.

4. Dumais, S., "LSI meets TREC: A status report", Technical Report, Bell Communications Research, Morristown N.J., 1993.

5. Gallant, S. I., "A practical approach for representing context and for performing word sense disambiguation using neural networks", *Neural Computation,* 3, 293–309, 1991.

6. Gallant, S. I., "Context vector representations for document retrieval", *Proc. AAAI Workshop on Natural Language Text Retrieval,* Anaheim Calif., 15 Jul. 1991.

7. Hecht-Nielsen, R., Neurocomputing, Addison-Wesley, Reading Mass., 1991.

8. Koll, M. B., "WEIRD: An approach to concept-based information retrieval", Preprint, School of Information Studies, Syracuse Univ., Syracuse N.Y., c. 1979.

9. Landauer, T. K., and Littman, M. L., "Fully automatic cross-language document retrieval using latent semantic indexing", Technical Report, Bell Communications Research, Morristown N.J., c. 1990.

10. Oja, E., "Principal components, minor components, and linear neural networks", *Neural Networks,* 5, 927–935, 1992.

11. Oja, E., Ogawa, H., and Wangviwattana, J., "PCA in fully parallel neural networks", in: Aleksander, I., and Taylor, J. [Eds.] Artificial Neural Networks, 2, 199–202, Elsevier, Amsterdam, 1992.

12. Ossorio, P. G., "Classification space: a multivariate procedure for automatic document indexing and retrieval", *Multivariate Behavioral Research,* 479–524, October 1966.

13. Osterberg, M. and Lenz, R., "Unsupervised feature extraction from first principles", Preprint, Image Processing Laboratory, Linkoping University, Sweden, 1993.

14. Raghavan, V. V., and Wong, S. K. M., "A critical analysis of vector space model for information retrieval", *J. of Amer. Soc. Inf. Retrieval,* 37, 279–287, 1986.

15. Robertson, S. E., "Progress in documentation", *J. of Documentation,* 33, 126–148, June 1977.

16. Salton, G., "Developments in automatic text retrieval", *Science,* 253, 974–980, 30 Aug. 1991.

17. Salton, G., and Buckley, C., "Global text matching for information retrieval", *Science,* 253, 1012–1015, 30 Aug. 1991.

18. Salton, G., Wong, A., and Yang, C. S., "A vector space model for automatic indexing", *Comm. of the ACM,* 18, 613–528, November 1975.

19. Sparck-Jones, K., "Search term relevance weighting given little relevance information", *J. of Documentation,* 35, 30–48, March 1979.

20. Strang, Gilbert, Linear Algebra And Its Applications, Second Edition, Academic Press, New York N.Y., 1980.

21. Sutcliffe, R. F. E., "Distributed representations in a text based information retrieval system: a new way of using the vector space model", *Proc. SIGIR'91 Conf.,* ACM, Chicago Ill. 13–16 Oct. 1991.

22. Van Rijsbergen, C. J., "A theoretical basis for the use of co-occurrence data in information retrieval", *J. of Documentation,* 33, 106–119, June 1977.

23. Wong, S. K. M., et al, "On modeling of information retrieval concepts in vector spaces", *ACM Trans. on Database Sys.,* 12, 299–321, June 1987.

DOCUVERSE

An Intuitive Visual Representation System for Exploring Large Document Sets

1. Executive Summary

A critical problem facet by analysts is the ever growing volume of written material that is available. It is said that well in excess of 90% of all desired intelligence information is sitting in available documents, waiting to be found and digested. Boolean query based document retrieval and routing systems were, historically, the first attempt to find a way to access large document corpora on the basis of topics of interest. Next-generation meaning-similarity based document retrieval and routing systems (in particular, HNC's TIPSTER program system) are now being developed. These are expected to significantly increase the productivity of analysts in terms of increasing their ability to much more quickly and comprehensively access documents that pertain to a particular area of interest.

Although high-performance document retrieval and routing is of critical importance, it only addresses one aspect of an analyst's job. Namely, to probe document databases for information of a known type. Another, equally important, analyst function is to search for unexpected and unusual developments. To look for new trends and emerging activity patterns. Document routing and retrieval systems based upon searching for specified types of information cannot, by their very nature, be of much use in carrying out this exploratory function. What is needed is a way for analysts to somehow "get into" the universe of documents and roam around—to get to know the structure of the document database and look for any oddities or surprises that present themselves.

This White Paper proposes a new type of document database exploration tool—one that is designed to allow analysts to exploit their powerful natural visual pattern recognition skills to explore the information content of huge numbers of documents simultaneously. It will be the analyst's window into the document universe. We therefore call this concept the DOCUVERSE system.

The goal of the DOCUVERSE system is to support an intuitive, easy to control, exploration process whereby aspects of the contents of large numbers of documents can be rapidly assessed. The substrate for this process is a color graphics visual representation of a set of documents on a computer screen (e.g., a color graphics workstation or a PC or PS/2 computer equipped with a graphics board). This representation, which will exploit some of the artificial reality image generation technology developed for use in Hollywood films and flight simulators, will portray each document, in the set of documents being considered, as a 3-dimensional object or icon with a specific shape, size, color, texture, and movement located in a three-dimensional cyberspace. Each of these attributes associated with each document corresponds to the document's content's similarity of meaning with one of a set of user-chosen features (such as a body of text indicating a topic of interest). Coded information about a document (such as when it was written or the identity of its author) can also be used as a feature. This will allow an analyst to view large groups of documents in a multi-attribute space.

The project discussed in this White Paper will develop a prototype DOCUVERSE system. The system will be written in the C software language and it will run under Unix on an off-the-shelf color graphics workstation. It will not depend upon any other special hardware, but will utilize the workstation's color graphics display capability and the workstation's mouse.

This project will also include the procurement and installation of a TIPSTER Software Evaluation System Sun Microsystems workstation system (integrated with the DOCUVERSE system workstation) capable of running the software being developed by the TIPSTER document detection contractors.

2. Definition of the Problem 2.1 The End-User Problem

Effective access to large databases of textual information is a continuing operational problem. Ongoing developments in computer networks, query-based retrieval and routing systems, and electronic mail systems are providing ever increasing access to documents of interest on specific topics. However, analysis of the contents of these documents and exploratory discovery of trends and changes in this content must still be carried out manually. Tools for supporting this crucial area of work simply do not exist Since these activities represent perhaps half of an analyst's job, the development of computer-based tools in this area is of the highest importance.

2.2 The Technical Problem

Advanced searching and retrieval methods provide the capability to locate a large fraction of the information on a specified topic that exists within a document database. The final product of a system based upon these methods is a prioritized list of documents that are relevant to a specified topic. The analyst must then examine these documents and use their content to reach conclusions. Thus, a "one-document-at-a-time" analysis bottleneck is created, which often limits the analyst's ability to quickly identify trends, changes, etc. What is needed is another way to deal with the contents of a preselected set of documents (e.g., the output of a query-based retrieval and routing system) on a mass basis. Specifically, it is desirable to have a capability for viewing the documents as individual objects floating in a visual cyberspace, with the position and display of each object determined by its ranking or correlation with user-defined document attributes. The goal is to produce a document set content exploration system that can operate on large document sets and which can exploit natural human visual scene analysis capabilities.

3. The DOCUVERSE System Concept

Human vision can perceive and interpret many dimensions of information if the information is encoded and represented correctly. Context vector representation and high resolution displays are enabling technologies for visualization of textual information. Display of information can be accomplished such that humans can "navigate" through abstract representations of textual databases. That is the purpose of the DOCUVERSE system.

This section begins with a review of the HNC technique of context vectors. The DOCUVERSE System concept is then explained via discussions of its constitutive elements.

3.1 Context Vectors

HNC's TIPSTER project document retrieval and routing system and the DOCUVERSE system proposed here are both based upon the use of context vectors. A context vector is a point on the unit radius sphere in n-dimensional Euclidean space that represents the meaning content of a document (or a segment of a document). The components of the vector are the correlations of the overall document meaning with the meanings of some fixed features. Features include carefully chosen highly descriptive terms that represent the concepts of a small context-free language. Other future values are adaptively learned from the corpus. By means of a mathematical technique (see the HNC TIPSTER Project Proposal and Project Documents for details) a context vector can be assigned to any word, phrase, or document segment. As we have shown on the TIPSTER project, these context vectors provide an accurate guide to similarity of meaning—regardless of the nature of that similarity. This new approach can be contrasted with more conventional similarity of meaning techniques, such as the WordNet system.

Prof. George Miller and his colleagues at Princeton University have developed a type of associational dictionary called WordNet. WordNet consists of several data structures—one for verbs, one for nouns, one for adjectives, etc. The verb structure is a mathematical ordered tree structure generated by the relation "in the manner of". A verb in the tree is connected above another verb if the latter verb action is in the manner of the former. For example, the verb walk lies below, and is connected to, the verb move in the verb tree, because walking is an action in the manner of moving. The noun tree in WordNet is similar to the verb tree, except that the relation is "is a kind of". Thus, animal lies above and is connected to dog, because dogs are a kind of animal.

Experiments carried out under the TIPSTER Program have shown that HNC's context vectors capture the very limited kind of similarity found in WordNet, and much more. Although exhaustive testing has not been carried out, spot checking has shown that pairs of words WordNet considers close in meaning are also considered close in meaning by the HNC context vector system. However, context vectors go beyond this. For example, because of the very limited relations that are coded in WordNet, no relationship at all would be found for the words drive and automobile (since one is a verb and the other a noun). However, the context vectors for these words are quite close, as are those for block and city, and block and tackle. On the other hand, the context vectors for the words automobile and dog are not close. In fact, since the similarity of context vectors for words flows from the statistics of their close proximity in huge volumes of text, essentially all types of similarity of meaning become automatically incorporated into this meaning representation. This carries over into the context vectors for phrases and document segments, since these are constructed by taking weighted vector sums of word context vectors.

Besides providing an excellent vehicle for the encoding of meaning, the mathematical form of the context vectors can be exploited to develop a fast searching method so that the similarity of meaning of each document in a document set can be determined rapidly. It is also possible to do trimmed searches to find only those documents that have a high correlation of meaning with a particular context vector. These properties flow from the facts that comparing similarity of meaning is carried out by the simple mathematical operation of taking the inner or dot product between the selected context vector and those of the documents to be rated as to similarity. Searches through large document sets for close matches can be carried out by means of hierarchical cluster searches, which are very efficient and fast.

In summary, HNC's context vector approach provides a practical means for representing the meaning of a word, phrase, or document and for comparing the similarity of meaning of multiple documents.

3.2 Data Objects

Figure 14:
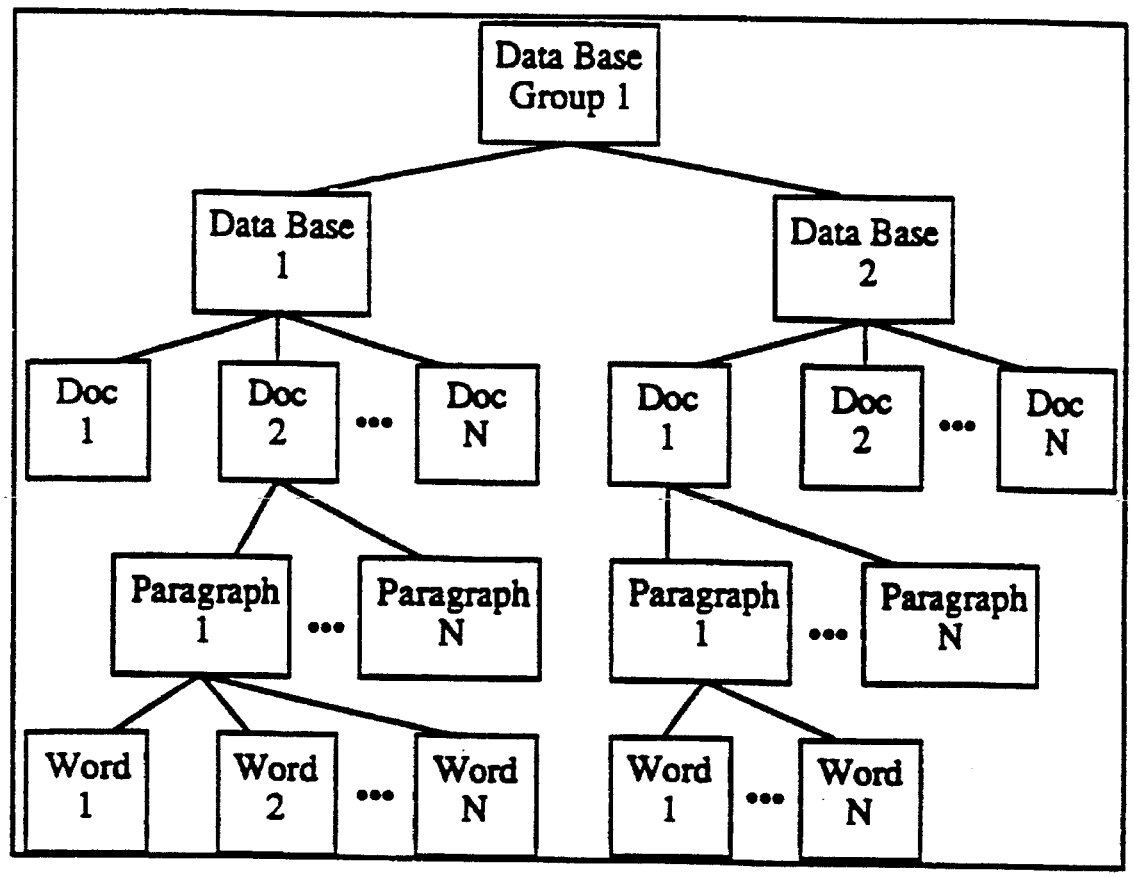
FIG. 14 is graphical representation of the hierarchical a data object definition and organization in a Docuverse system.

The documents that make up the databases of interest for analysis contain information that is hierarchically organized into sets of nested data objects (see FIG. 14) For the purposes of this proposal, these data objects could be any of the following (other possibilities, such as images, line drawings, and logos will be ignored here):

Words.

Part of a document (sentence, paragraph, section or chapter).

Document.

Set of documents.

Database of documents.

Set of databases.

The DOCUVERSE system will be able to display content information on most or all of these types of objects. However, to keep the presentation simple, we will concentrate here only on the case where the data objects being portrayed are all documents.

3.3 Artificial Reality Display Systems

The DOCUVERSE system will employ state-of-the-art computer graphics techniques to create a visual display of the document universe to be explored. This display will be constructed using artificial reality software that will be adapted for this project from an existing software package. The basic ideas behind this software are described in this subsection.

During the 1980s, two very similar standard high-level graphics software interfaces were developed—GKS (the Graphical Kernel System) and PHIGS (the Programmer's Hierarchical Interactive Graphics System). These are now merged into a standard PHIGS interface that is supported by multiple workstation vendors (e.g., Sun Microsystems, Hewlett-Packard, IBM, and Silicon Graphics), along with many enhancements (which we shall automatically include when we hereinafter say "PHIGS"). For details on computer graphics, GKS, PHIGS, X-Windows, and related issues see:

Hill, F. S., Computer Graphics, Macmillan, New York, 1990.

Kessener, L. R. A., Data Structures for Raster Graphics, Springer-Verlag, Berlin, 1985.

Foley, J. D., and van Dam, Fundamentals of Interactive Computer Graphics, Addison-Wesley, Reading, Mass., 1983.

The basic idea of PHIGS is that the graphics creation job is broken into two pieces: describing the objects to be displayed to the user, and generating the display of those objects from a user-selected eyeball position, direction of look, and panoramic angle of view (i.e., zoom level). The first job is that taken on by the application software. The second job is automatically carried out by PHIGS.

The description of a 3-dimensional scene used as input to PHIGS is simply the definition of each individual object to be displayed, expressed as a set of linked polygons located in a fixed 3-dimensional coordinate system, with each polygon having specified light reflectivity properties (color, specularity, texture, etc.). The polygons make up the visible exterior surfaces of the objects to be displayed. The lighting of the objects and the calculation of their appearance to the user from his or her selected eyeball vantage point is the job of PHIGS.

On some workstations, PHIGS is implemented primarily in software. On others, PHIGS is implemented primarily in hardware. While the ultimate screen appearance is essentially the same in both cases, those workstations that implement PHIGS in hardware are usually able to display imagery at speeds that would be consistent with a human analyst's work pace, whereas those that implement PHIGS primarily in software would be too slow for such applications. It is important to note that PC and PS/2 computers could also run PHIGS at a satisfactory speed, if a special graphics display board were used.

The artificial reality software that we will use on this project will be able to take the icons to be displayed (with all of the "attribute" information about them—see below) and convert their attributes into a list of polygons that PHIGS should display to the user. This sounds simple, but will actually involve considerable complication. For example, if a group of icons exists at a distance that is too far away to flow the individual icons to be resolved, the software will have to replace the individual icons with a realistic rendering of a "cloud" of icons. In order to allow the effective use of human visual scene analysis, this rendering, and all others, will have to be done with very high quality. Another example is how icons of different size will be displayed at different distances. This will require some clever darkening or shadowing to make size obvious at variable distances. Another possibility is to employ a "fog" that reduces visibility at greater distances. These are all problems that have been solved by artificial reality companies that do computer-generated graphics for Hollywood films, flight simulators, molecular modeling, high-quality video arcade games, and advertisements.

3.4 Data Object Representation

The DOCUVERSE system will display data objects to the user in the form of three-dimensional graphics icons. These icons will have attributes associated with them. An attribute is a user-selected descriptive feature that describes one aspect of the meaning of the data object. Each attribute will have a value between some minimum (say, 0) and some maximum (say, 1). The goal of the display is to show the user all of the attributes of each data object for a large set of data objects in one grand visual display. To do this, we shall exploit almost every human visual (and computer graphics!) skill.

Figures 15, 16:
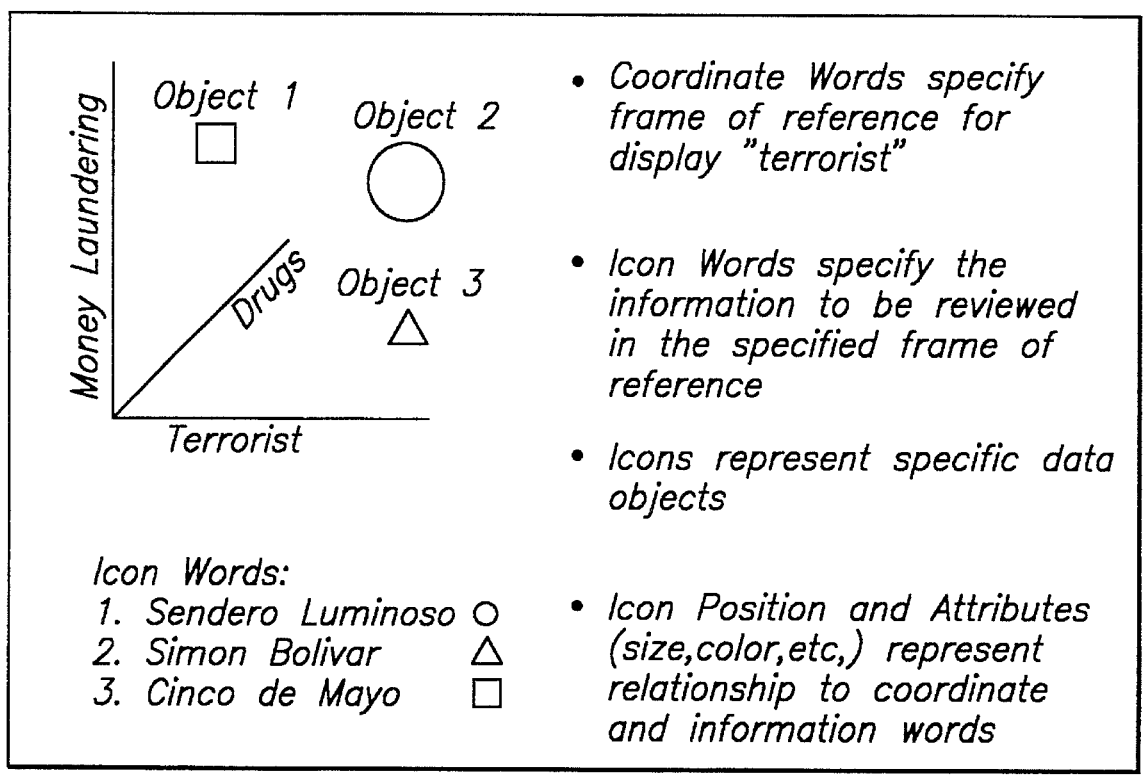
FIG. 15 is a graphical representation of possible visual degrees of freedom for icons used in the Docuverse system.
FIG. 16 is a graphical representation of the coordinate selection and information display used in the Docuverse system.

The basic idea is that the icon that represents each individual data object will have many visual degrees of freedom (see FIG. 15).

These degrees of freedom will be "orthogonal", in the sense that they can be set independently of each other. Some examples are: position in space, size, shape, color, distortion, surface texture, and motion. Perhaps, via audio imaging, sound could also be used.

Since the computers used will have graphics capabilities, the presentation of each icon will be visually very sophisticated. Each individually resolvable icon will be portrayed as an easily identified object in its proper position and possessing its assigned attributes. The display will resemble more a photograph of a real scene than an artificial reality display. Except that the objects will be icons. By means of simple mouse commands the user will be able to navigate around in the 3-dimensional cyberspace. A user-selected window will be available to show the entire cyberspace (a cube) and show the user's present position and their current direction of look through the screen of the display. The user will be able to effortlessly change their position to any new (x,y,z) position and rotate their direction of gaze to any new azimuth and elevation (the viewscreen will always remain horizontal, i.e., parallel to the x-y plane, in its boresight rotation). While quick changes in position and angle will be possible, smooth motion will not—as this would require an expensive specialized processor.

Icons that lie at too great a distance from the viewscreen to be resolved will be represented as points of light, or, if they are in groups, as shaded regions—sort of like the milky way. This will allow users to assess the locations of distant data objects. Options such as the introduction of a "fog" that limits distant vision will also be available.

At low zoom levels the user will be able to see the entire cubical cyberspace within the viewscreen. At these zoom levels individual objects will typically be invisible and only large groups of documents will be seen. The density of these groups will be represented via 3D shading. By moving the viewscreen around the cyberspace cube the 3-dimensional layout of the entire document set will be visible. This will then suggest strategies for moving into specific regions for a closer look.

Another user option will be to simply double-click on any icon to open that document for inspection. This will cause a new overlay window to appear containing the text of the object and presenting the TIPSTER-like highlighter profiles (see TIPSTER Project documentation for derails) for the object (for each of the icon display attributes the user has chosen). By clicking anywhere on any of the highlighter profiles the text block displayed will instantly jump to the designated passage. The ability to roam a document universe at warp speed and then instantly locate and jump to passages of specific content in a document can reasonably be expected to increase analyst productivity many times over. The difference between manual searches through sets of retrieved documents and exploring the same set with the DOCUVERSE system will be like the difference between the Wright Flyer and the Starship Enterprise. We hope to give each analyst the power to continuously monitor all available textual information in their area of responsibility, and still have time to enjoy life.

3.5 Attributes

The attributes that determine the degrees of display freedom of the icons are chosen by the user by making selections via a user interface on the workstation. Preliminary concepts about how these attributes will be selected and used are now discussed. Task 1 of this project will be devoted to carefully defining the various methods that will be available to the user for selecting and using the attributes.

Coordinate System Selection: Coordinate Words

Spatial coordinates of displayed icons are specified by three context vectors (see FIG. 4). Context vectors can be from words ("coordinate words"), groups of words, documents or sets of documents. Coordinate words define a (non-orthogonal) basis space for viewing the projected information content of data objects in 3D. Example coordinate words might be "Terrorist", "Drugs", and "Money Laundering". Positions for display of icons will be computed based on the projection (dot product) of the data objects' context vector with the context vector for the coordinate word. It will also be possible to use other data object attributes as "coordinate words". For example, one coordinate axis could be used to display the date of production of each data object. Another could display whether the author was Fidel Castro or not, etc. (See FIG. 16).

Information Content Display Control: Icon Words

Figures 17, 18:
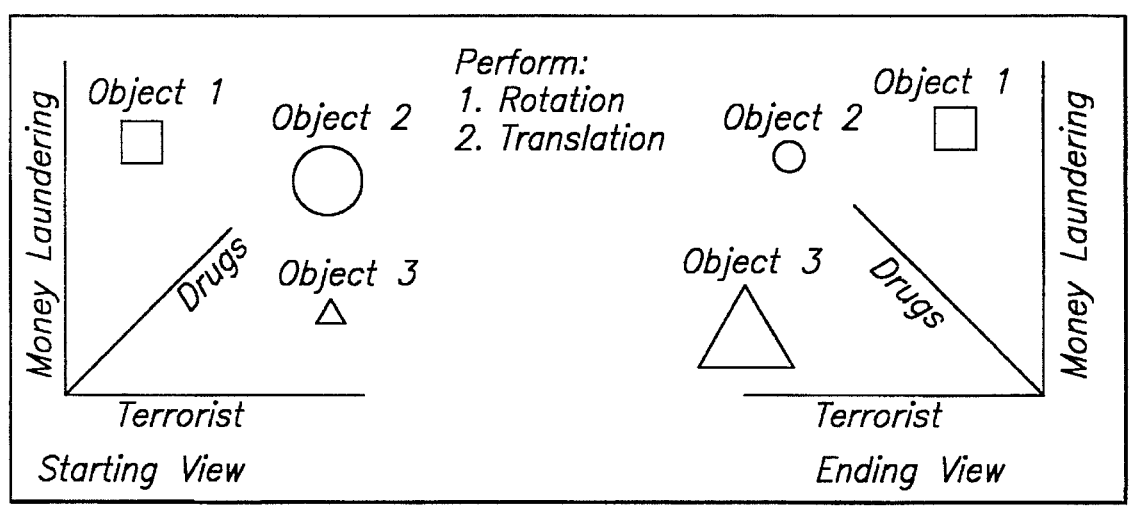
FIG. 17 is a graphical representation of icon displays used in the Docuverse system.
FIG. 18 is a graphical representation of using a "point of view" in the Docuverse system.

In addition to the coordinate words, the user can specify a set of "icon words". Icon words determine the additional information that will be displayed (i.e., as the shape, color, texture, size, and motion of the icon, see FIG. 17). Icon attributes will be determined by computing the projection of the context vector for the data object attributes with context vector for each icon word. One icon attribute will be associated with each icon word.

Qualification of Display Objects

Qualification of data objects will be allowed to help reduce visual clutter and information overload. Boolean qualification will be sets of key words to match. Icon attributes will be displayed only for those objects that are a hit. Probably the most common qualification approach will be to simply use a retrieval and routing system to select a body of suitable documents.

Exhaustive enumeration of data objects will be allowed: e.g. Document 4, Document 1544, Document 3, Database "set.info.lib.text" either as keyboard command or "point and click" with mouse.

Context vectors can be used to perform data object qualification via dot products and thresholding (similar to routing approach). Clustering can be used to associate data objects with similar information content. Only objects within a cluster will be displayed.

Traversing the Space: Changing Point of View

Selection of coordinate words or object-associated data defines the display basis space. Selection of icon words determines which kinds of information are displayed. Input from a pointing device (mouse, etc.) determines the viewpoint of the user in the 3D coordinate space. Changes in this viewpoint (and in zoom level and angle of view) will be carried out using standard, off-the-shelf computer graphics and artificial reality methods.

All data objects at the current level of display hierarchy are displayed using 3D, perspective and hidden line removal. User can modify his viewpoint, coordinate or icon specifiers at any time to gain full insight into the information contained in the database (see FIG. 18).

Scope Control: Preventing Information Overload

Data object qualification provides the first method of overload reduction. Hierarchical organization of the data objects provides the second method of overload reduction. The user selects a data object for examination of subordinate objects using pointing device: "Zoom-in" to lower level of detail. When zooming in on an object, all higher level, non-selected objects are erased from the display. We will consider a mode whereby each document is nominally displayed as an icon and where the user will be allowed, if desired, to dive inside that icon and examine the document's chapters, sections and paragraphs as sub-icons. Diving inside a paragraph might cause the text of that paragraph to be automatically displayed in a screen window.

At the lowest level in the hierarchy the text of the data object is displayed. The user may ascend and descend the hierarchy to any desired level. Higher level objects (such as sets of documents) are restored when ascending the hierarchy.

Automated Determination of High Information Coordinates for use as Attributes

Besides allowing the user to select attributes, the DOCUVERSE system will be capable of automatically selecting coordinates for a document set. These coordinates will be selected on the basis that they have the highest possible information content. For example, the simplest such coordinates would be the principle components of the document set covariance matrix. These are obtained by considering the data object's context vectors as points in feature space. These points form a cloud, with one point for each object. Principal component analysis simply fits the best fitting ellipsoid to this cloud (in a mean squared error sense). The longest perpendicular principal axes of this ellipsoid are then the principal axes of the data set (in many real-world cases only a few of the ellipsoid axes will be very long—the short ones can then be ignored, with little resulting error). The attributes would then be these principal components.

While principal component analysis usually works well as a first-order approximation, it often fails to yield accurate representations. A generalization of the principal component method has been developed by Cottrell, Monro, and Zipser and extended by Hecht-Nielsen. This method uses a neural network to fit a general curvilinear coordinate system inside the data set, in which the coordinate axes remain approximately locally orthogonal, but curve to fit the actual form of the geometrical "cloud" of data in the set. This method is expected to yield attributes that have the highest possible information content in terms of their ability to represent the original document context vectors. HNC is currently engaged in an effort to refine this method. The results of this effort, which is sponsored by the SDIO Office of Innovative Science and Technology and managed by the Mathematical Sciences Division of the Army Research Office, will be used in the project proposed here.

3.6 A Specific Example

Finally, we present a specific fictional example of how some of the capabilities of our proposed DOCUVERSE system might be used. Rather than present an example that explores the more obvious projected capabilities of the DOCUVERSE concept, we discuss a situation that illustrates one of the innovative ways in which the system will probably be used. The objective in this example is to determine, in near real-time, the nature of the information being transmitted on a high-speed non-encoded (or decoded) data link.

Data: Intercepted high bandwidth (10 MB/sec) data link that contains text information.

Obstacles: There is far too much information for the available analysts to manually read messages within an acceptable amount of time.

Approach:

Step 1: Specify Coordinates

Analyst defines display coordinate space by selecting a set of coordinate words of interest:

Drugs

Money Laundering

Terrorists

Figure 19:
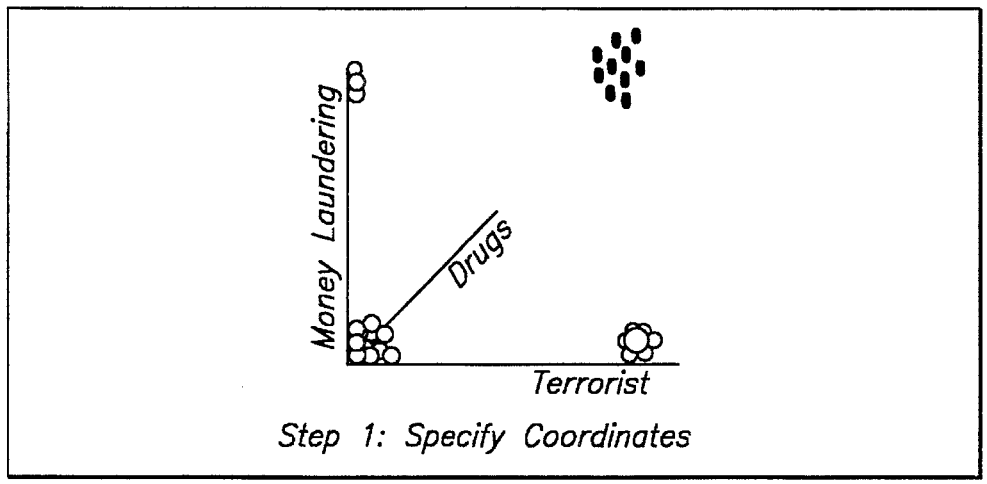
FIG. 19 is an example of specifying coordinates in the Docuverse system.

DOCUVERSE displays representation of information contained in messages as icons in selected coordinate space (see FIG. 19).

Step 2: Inspect and Select Data

Figure 20:
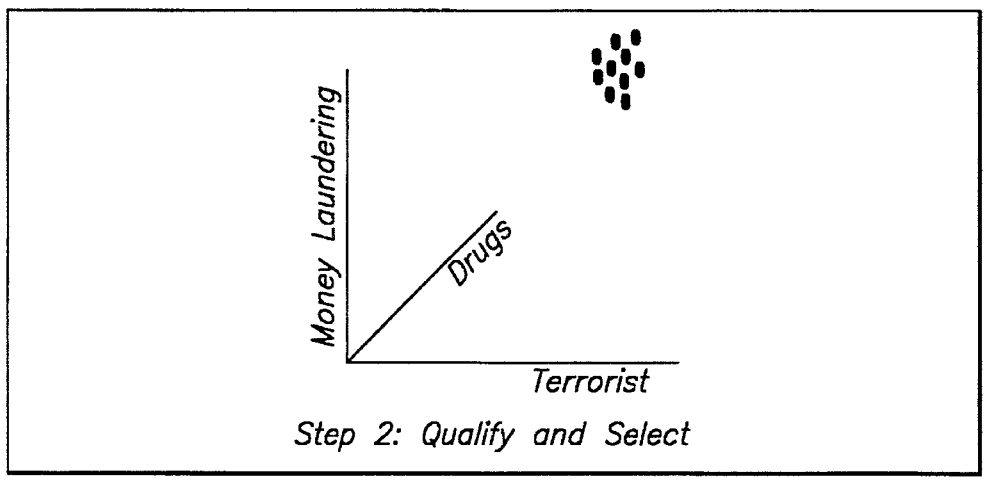
FIG. 20 is an example of qualifying and selecting data in the Docuverse system.

Analyst determines which messages are of interest in the "terrorist, drugs, money laundering" coordinate system by visual inspection and qualifies (selects) a set of messages with mouse for more detailed inspection (see FIG. 20).

Step 3: Change Point of View

Figure 21:
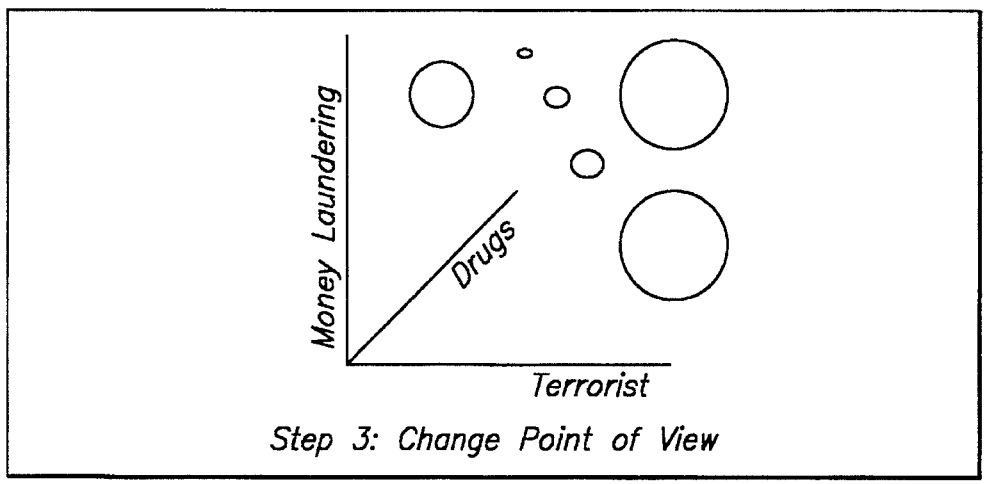
FIG. 21 is an example of changing the point of view in the Docuverse system.

Using a mouse, the analyst moves in the selected coordinate space to gain a clearer understanding of information in messages. The display is updated to reflect new point of view (see FIG. 21).

Step 4: Select Icon Words and Attributes

The analyst selects additional data dimensions for investigation by specifying icon words:

"Sendero Luminoso"

"Simon Bolivar"

"Cinco de Mayo"

Figure 22:
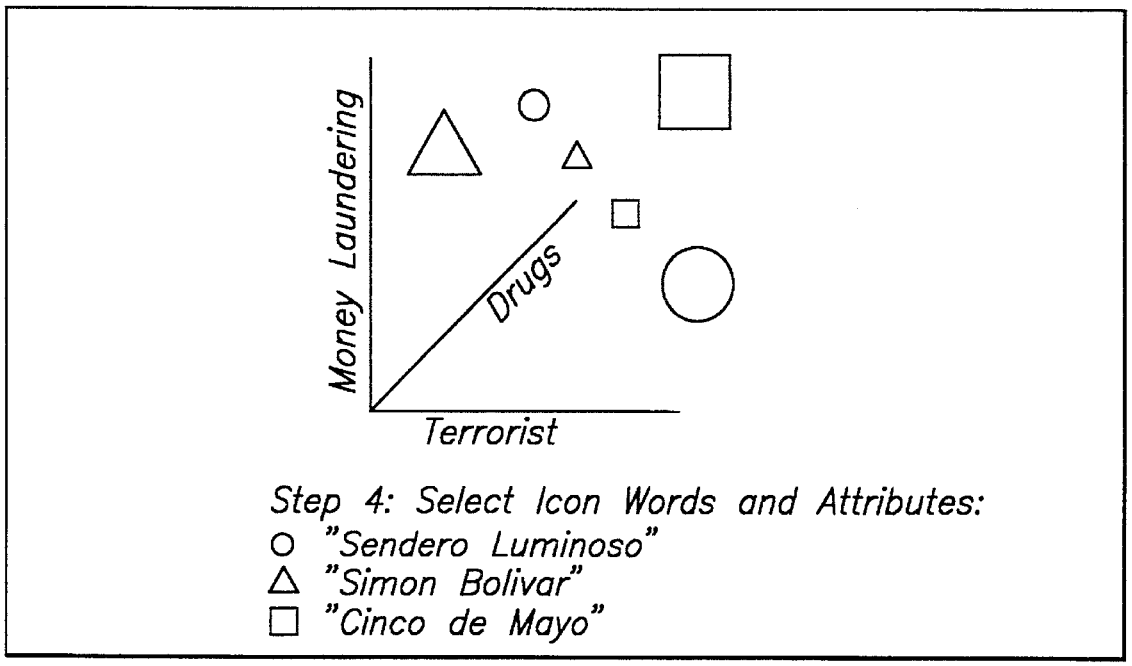
FIG. 22 is an example of selecting icon words and attributes in the Docuverse System.

The display is updated to reflect the message information content relative to icon words. Messages that have high correspondence with these icon words will be easily visible (see FIG. 22).

Step 5: Zoom

Figure 23:
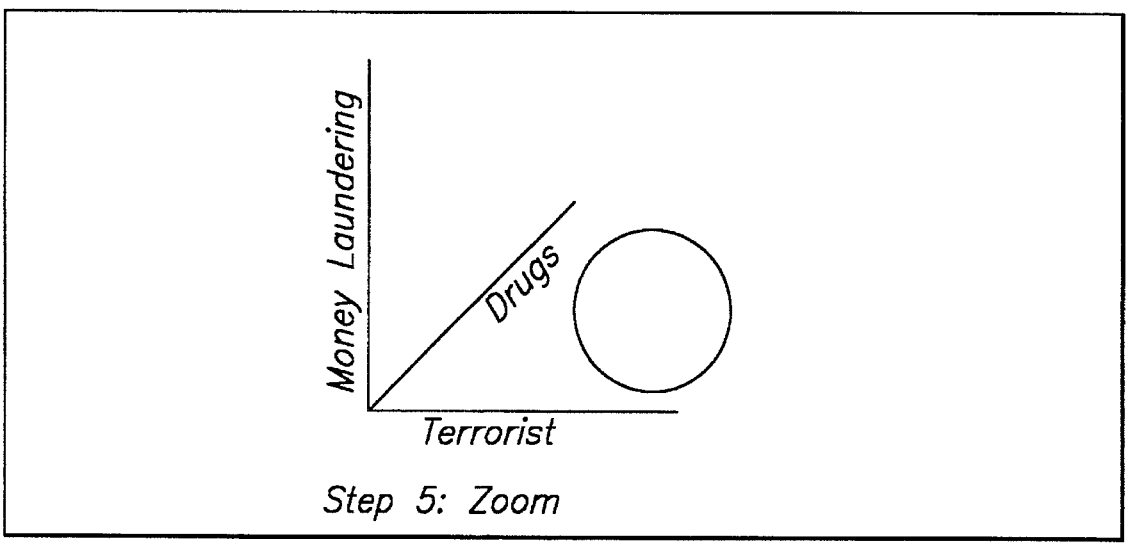
FIG. 23 is an example of zooming in the Docuverse system.

The analyst will then select the most relevant data object for zoom-in examination of message information. The display is updated to reflect adjusted point of view (see FIG. 23.) 11).

Step 6: Inspect

Figure 24:
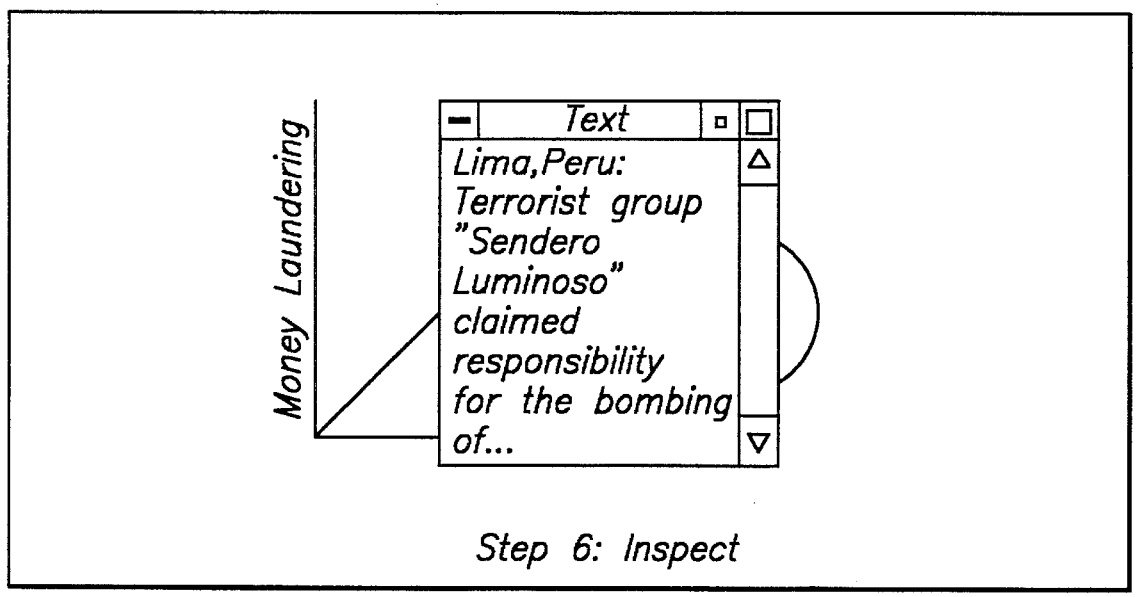
FIG. 24 is an example of inspecting data in the Docuverse system.
Figure 25:
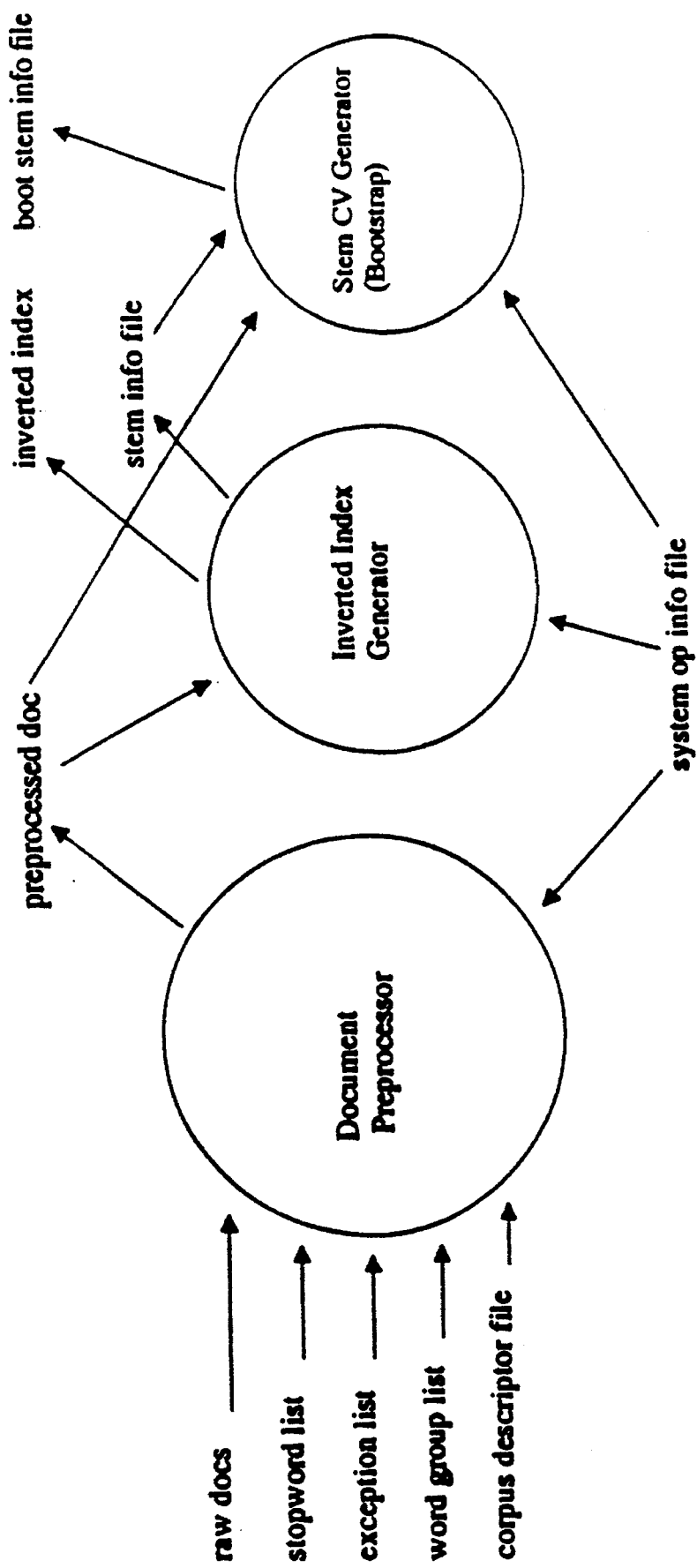
FIG. 25 is a data flow diagram of context vector generation in the MatchPlus system.
Figure 26:
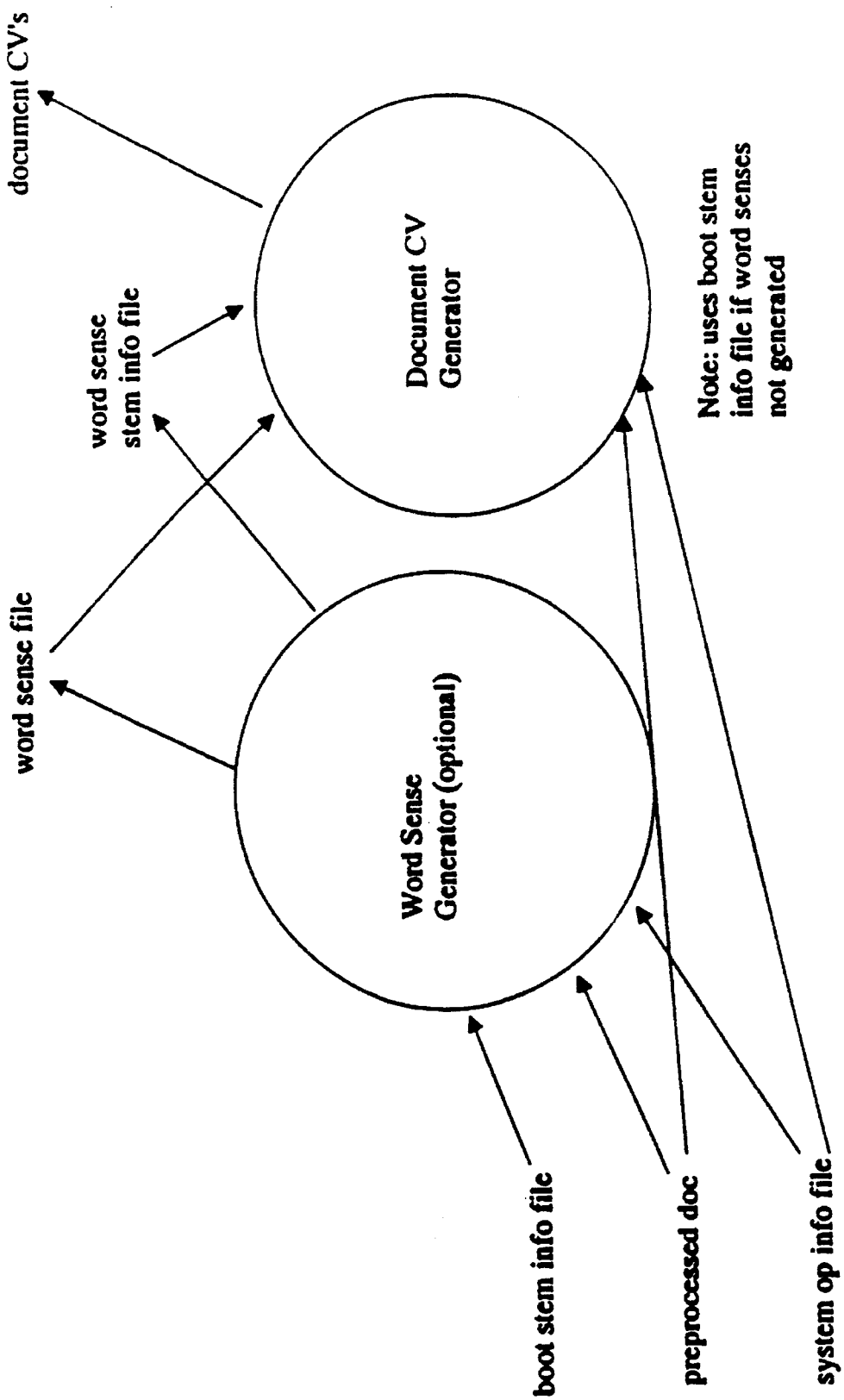
FIG. 26 is a continuation of FIG. 25.
Figure 27:
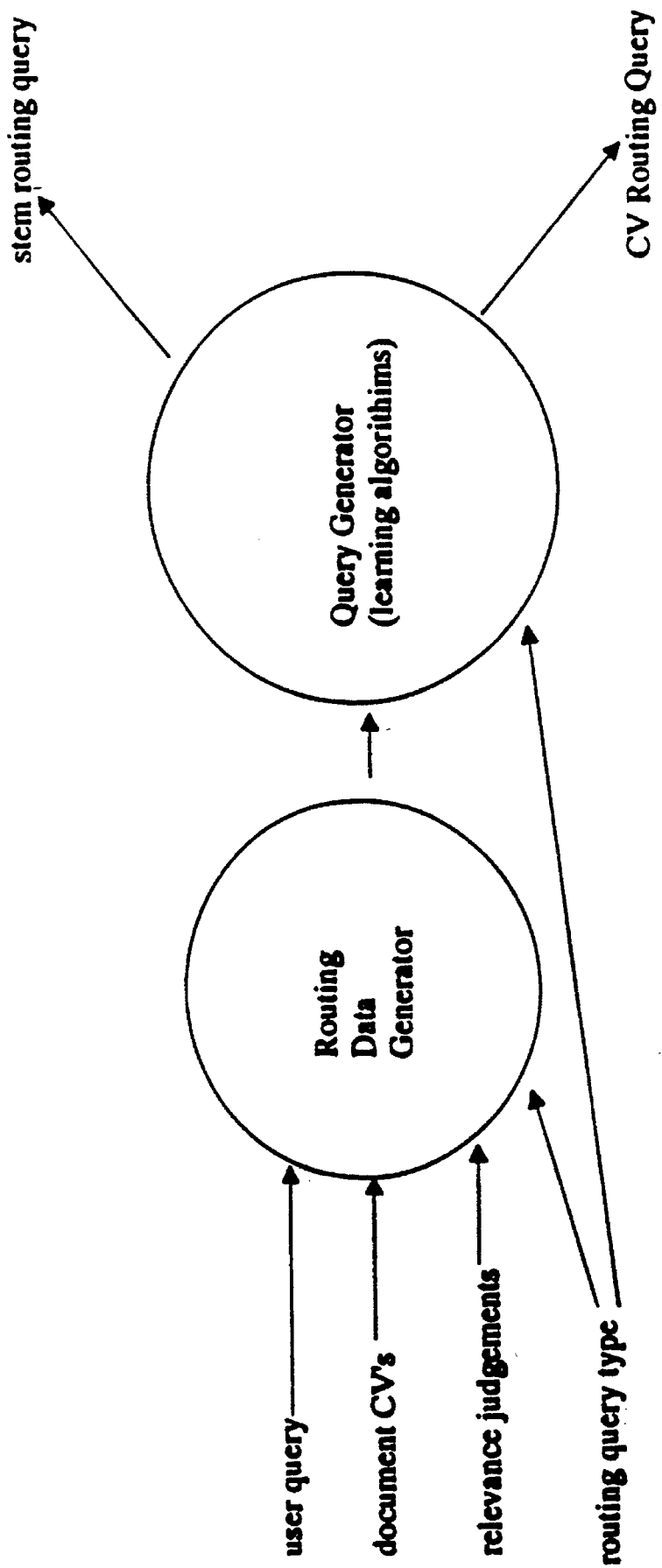
FIG. 27 is a data flow diagram of routing query generation in the MatchPlus system.

The text of the selected message is then displayed for manual inspection (see FIG. 24).

3.7 Advantages of the DOCUVERSE System Concept

In summary, the DOCUVERSE system will provide new data exploration capabilities for analysts. Some of the advantages of this system are listed below.

High Speed: Allows inspection of the information content of large volumes of isolated text without the need for manual reading of messages.

Cost Effective: Allows fewer analysts to perform more work.

Easy to Use: Intuitive user interface exploits natural scene interpretation capabilities of human visual system.

Compatible: DOCUVERSE uses same context vectors and features as HNC's TIPSTER routing/retrieval system.

Flexible: No assumptions made about nature of information. Could be applied to interpretation of speech if words are tagged with context vectors. Could even be used for specific-attribute gisting of foreign language message traffic.

Standard Hardware: Standard computer graphics workstations or PC/PS2 computers with a graphics board.

Fast User Training: Intuitive human interface minimizes training requirement.

HNC MatchPlus Functional Specification

HNC MatchPlus Modules

The MatchPlus approach to information retrieval uses high dimensional vectors (280 dimensions) called Context Vectors. Context vectors represent all stems, documents, and queries in the same vector space. This allows direct comparison between any two of these objects by taking a dot product.

System generation begins with the preprocessing of documents to handle format problem, remove stopwords, etc. Next an inverted index is generated for later use in retrieval. The Bootstrap step creates context vectors for all stems, so that similarly used stem have similar vectors. Next, there is the option of generating word senses for commonly used stem, where each word sense receives its own context vector. The final step in system generation is the creation of document context vectors by summing stem context vectors (with appropriate weightings).

For routing queries where there are documents with relevance judgements, a routing data generator extracts data so that neural network algorithm can generate a query. There are two types of routing query, either term weights for a given query or an entire query context vector.

For ad hoc queries, either the user supplies an initial query or the Topic Processor automatically converts a Tipster topic to an initial query.

Once the query has been determined, the Document Retriever fetches as many documents as desired, in order by estimated relevance to the query.

As a final step, the Output Combiner may optionally combine several lists of documents retrieved for the same query into one merged list.

The following sections give detailed descriptions of MatchPlus modules in the same order in which they appear in FIGS. 25–28.

1 Document Preprocessor 1.1 Functional Description

This module preprocesses raw text, taking stems off of words, taking out stop words, and deleting extraneous characters.

1.2 Data Specifications 1.2.1 Input Specification

Inputs consist of:

The 'raw documents file' in the files of the corpus.

The 'stopword file' which lists words to be dropped.

The 'exception file' which lists words that are NOT to be stemmed.

The 'word group file' which gives pairs or groups of words that are to be treated as a unit during training; an example is 'united states'.

The 'corpus descriptor file' which contains the location of corpus components.

1.2.2 Output Specification

Outputs consist of:

The 'preprocessed documents file' which contains stemmed words, word pairs, etc.

2 Inverted Index Generator 2.1 Functional Description

This module makes a pass over the preprocessed documents and creates the inverted index file and a file of information about each stem in the corpus.

There are two steps in this process:

1. For each stem, the generator creates an inverted index consisting of the stem and the document(s) that stem occurred in.

2. For each stem, the generator creates the 'stem info file' containing information such as the number of documents the stem occurred in, a pointer to the context vector for the stem, and the word-sense meaning of the stem.

2.2 Data Specifications 2.2.1 Input Specification

Inputs consist of:

The 'preprocessed documents' containing stemmed words and word pairs.

2.2.2 Output Specification

Outputs consist of:

The 'inverted index file' consisting of stems and the documents they appear in.

The 'stem info file' consisting of information about stems such as number of documents the stem occurred in.

3 Stem CV Generator (Bootstrap)

3.1 Functional Description

This module generates an initial random Context Vector for each stem and modifies each stem according to its neighboring stems.

Two passes are made through the entire corpus. For each stem in each document the three stems on either side (neighbors) are summed up. After the pass is completed the sum of all the neighbors for each particular stem is factored into that stem's context vector.

3.2 Data Specifications 3.2.1 Input Specification

Inputs consist of:

'Preprocessed documents' are needed for getting each stem and allocating a Context Vector (280 floats) and determining the stem targets and neighbors.

The 'system op info file' specifies the document range in which bootstrapping is to occur.

3.2.2 Output Specification

Outputs consist of:

The 'stem info file' with the trained stem CV's.

4 Word Sense Generator 4.1 Functional Description

This module generates word sense information for frequently used stems.

There are three main steps in this process:

1. For each appearance of a frequent stem, a window context vector is computed for surrounding stems. For space considerations, the number of windows for each stem is limited to about 300 randomly selected windows.

2. The windows for each stem are clustered. Initially a variant of k-means clustering is used where the number of clusters is fixed at 7. Each cluster is represented by a centroid CV.

3. For each cluster centroid, the closest 10 stems are found. This information is only useful for communicating with humans and for debugging; it is not used in retrieval.

4.2 Data Specifications 4.2.1 Input Specification

Inputs consist of:

The 'stem info file' after bootstrapping. This file contains vectors for all stems.

'Preprocessed documents' are needed for finding window CV's.

The 'system op info file' specifies which part of the text is to be used for collecting windows.

4.2.2 Output Specification

Outputs consist of:

The 'word sense file' specifying CV's for every word sense.

The 'word sense stem info file', a modified stem info file that contains a pointer into the 'word sense file' for every stem that contains word senses.

5 Document CV Generator 5.1 Functional Description

This module takes the preprocessed documents, stem information, and word sense information and creates document context vectors. The context vector for each stem in a document is weighted according to various formulae, summed together, then normalized to create the document CV.

5.2 Data Specifications 5.2.1 Input Specification

Inputs consist of:

The 'preprocessed documents' containing stemmed words and word pairs.

The 'system op info file' which contains information about the range of documents to process The 'stem info file' which contains information about how many documents a stem occurs in, a pointer to its context vector, etc.

5.2.2 Output Specification

Outputs consist of:

The 'document context vector file' which contains a vector for each document derived from the stem context vectors in that document.

6 Routing Data Generator 6.1 Functional Description

This module generates the data necessary for stem routing and CV routing.

1. Stem routing data consists of the dot product between each stem in the query and the judged document. In addition the relevance judgement (a '0' or '1') is entered.

2. CV routing data consists of the document's context vector and the relevance judgements.

6.2 Data Specifications 6.2.1 Input Specification

Inputs consist of:

The Query stems and their CV's.

The 'relevance judgements' file with the official document id and the relevance judgements.

The 'read doc hash table' which is used to convert the official document id from the relevance file to an internal document number. This is necessary to get the document CV.

The 'context cvs doc file' which contains the document CV's.

6.2.2 Output Specification

Outputs consist of:

The 'stem routing data file' which is an ascii file with the query stems and the dot products between the query stems and the judged documents.

The 'CV routing data file', which is an ascii file with the products between each query CV vector element and each judged document CV element.

7 Query Generator (Learning Algorithms)

7.1 Functional Description

This module generates a routing (or ad hoc) query based upon data generated by the Routing Data Generator.

The learning algorithm used is the 'pocket algorithm with ratchet', a single-cell neural network algorithm.

7.2 Data Specifications 7.2.1 Input Specification

For a Stem Routing Query, the inputs are a set of training examples, where each example consists of the relevance judgment for a document, plus the dot product of the document's context vector with the stem context vector for each stem in the original user query.

For a CV Routing Query, the inputs are a set of training examples, where each example consists of the relevance judgment for a document, plus that document's context vector.

7.2.2 Output Specification

There are two types of query produced by this module:

A Stem Routing Query consists of a set of weights for each term in the original user query.

A CV Routing Query is a context vector that can be used directly to take dot products with document context vectors in order to determine the order in which documents are retrieved.

8 Topic Processor 8.1 Functional Description

This module generates the following from a Tipster Topic:

1. The stems from which to calculate the query CV. The stems may be taken from any of the sections of the topic (e.g. concepts, definitions etc.).

2. The stems that are required to be in a document (i.e. match terms).

3. Overall weights to assign a particular section of the Topic.

8.2 Data Specifications 8.2.1 Input Specification

Inputs consist of:

An ascii Topic file.

User inputs indicating the match criteria which sections of the Topic to use and any weights to apply to a particular section.

The stop word list.

The exception word list.

The word group list.

Word sense stem info file.

Word sense file.

8.2.2 Output Specification

Outputs consist of:

A user query.

9 Query Processor 9.1 Functional Description

This module generates a Query CV from a list of words taken from the following:

1. Output from any one of the sections in the Tipster Topics (e.g. concepts section).

2. Entered stems from the GUI 9.2 Data Specifications 9.2.1 Input Specification

Inputs consist of:

An ascii file with the query terms.

The stop word list.

The exception word list.

The word group list.

Word sense stem info file.

Word sense file.

9.2.2 Output Specification

Outputs consist of:

A Query CV (280 real numbers).

10 Document Retriever 10.1 Functional Description

This module takes the output from the Query Processor and produces an ordered list of documents.

First those documents that satisfy the $Match criteria are identified. (This group may be empty if, for example, no document satisfies the criteria or there are no $Match criteria.) These documents are then ordered by closeness of their context vectors with the Query Context Vector, and they are retrieved in that order.

After the $Match group is exhausted, remaining documents are ordered by closeness of their context vectors with the Query Context vector, and they are retrieved in that order.

10.2 Data Specifications 10.2.1 Input Specification

The Query Processor determines the $Match criteria, as well as a Query Context Vector.

The 'system op info file' specifies whether all or a subset of documents are eligible for retrieval.

The 'inverted index' allows quick determination of those documents that satisfy the $Match criteria.

10.2.2 Output Specification

Outputs are an ordered list of documents and dot product scores with the Query Context Vector.

11 Output Combiner (Optional)

11.1 Functional Description

This module combines output lists, from MatchPlus or any other source, making use of an estimate of the quality of each source.

The algorithm is to give each document a merit score. Letting i run over all input lists, each document receives a score consisting of the sum of the quantity 'goodness of list i'/'position of document in list i'.

Documents are then produced in order of their merit scores.

11.2 Data Specifications 11.2.1 Input Specification

Several lists of documents.

An estimated goodness for each list consisting of a non-negative fractional number.

11.2.2 Output Specification

An ordered list of documents.

What is claimed is:

1. In a computer having a processor and storage, a computer-implemented process of generating a set of summary vectors in a relative vector space such that for any subset of summary vectors associated with a subset of records there is a single logical relative orientation of the summary vectors that defines the relative meaning of the records, and a plurality of absolute orientations of the summary records, comprising the steps of:

(a) providing a training set of records for processing by the processor, each record containing a plurality of information elements;

(b) assigning to selected information elements in each record an initial context vector consisting solely of a plurality of randomly generated component data values;

(c) for selected information elements in each record, modifying the initial context vector of the selected information element by a function of the context vectors of information elements within a selected proximity to the selected information element and a proximity constraint that varies a magnitude of the modification to the initial context vector;

(d) for each record, determining a summary vector by combining the modified context vectors of the information elements of the record according to program instructions in the storage and executed on the processor; and (e) storing the determined summary vectors in the computer storage.

2. The computer-implemented process of claim 1, further comprising the steps of:

(f) determining whether an additional iteration is required to modify the initial context vector using a stopping criterion; and (g) responsive to the results of step (f), selectively repeating steps (c) through (e).

3. The computer-implemented process of claim 1, wherein:

the records comprise documents; and the information elements comprise words.

4. The computer-implemented process of claim 3, further comprising the steps of:

(a.1) removing stop-listed words from the documents;

(a.2) marking multiple-word phrases to be treated as single words; and (a.3) converting words into word stems.

5. The computer-implemented process of claim 1, wherein:

the records comprise documents describing medical procedures; and the information elements comprise ICD[9] codes.

6. The computer-implemented process of claim 1, wherein step (c) comprises the substeps of, for selected information elements in each record:

(c.1) designating the selected information element as a target element;

(c.2) defining a window comprising the target element and a plurality of neighbor information elements within the selected proximity, each neighbor information element having a position in the window relative to the target element; and (c.3) modifying the context vector of the target element as a function of the context vectors of the neighbor elements, the position of the neighbor elements, a frequency function determined by a number of records containing each neighbor element, and the proximity constraint.

7. The computer-implemented process of claim 6, wherein substep (c.3) comprises the substeps of, for selected neighbor elements:

(c.3.1) determining an error vector representing a difference between the context vector of the target element and the context vector of the neighbor element; and (c.3.2) applying the error vector to the context vector of the target element.

8. The computer-implemented process of claim 7, further comprising the substep of, for selected neighbor elements, adjusting the magnitude of the error vector according to the relative proximity of the neighbor element to the target element.

9. The computer-implemented process of claim 7, further comprising the substep of, for selected neighbor elements, adjusting the magnitude of the error vector according to a function dependent on the relative proximity of the neighbor element to the target element.

10. The computer-implemented process of claim 6, further comprising the substep of, for selected neighbor elements, determining the proximity constraint according to relative co-importance of the target element and the neighbor element.

11. The computer-implemented process of claim 10, further comprising the substep of, for selected neighbor elements, determining the relative co-importance according to the relative importance of the target element and the relative importance of the neighbor element.

12. The computer-implemented process of claim 11, further comprising the substeps of:

for the target element, determining the relative importance inversely according to the frequency of occurrence of the target element in the training set; and for selected neighbor elements, determining the relative importance inversely according to the frequency of occurrence of the target element in the training set.

13. The computer-implemented process of claim 11, further comprising the substeps of:

for the target element, determining the relative importance by the equation:

$$I_j = B + (1-B)\left(1 - \frac{\log\left(\frac{1}{ND_j}\right)}{\log\left(\frac{1}{TND}\right)}\right),$$

wherein:

B represents a predefined lower bound;

$ND_j$ represents the number of records containing the target element; and

TND represents the total number of records; and for selected neighbor elements, determining the relative importance by the equation:

$$I_j = B + (1-B)\left(1 - \frac{\log\left(\frac{1}{ND_j}\right)}{\log\left(\frac{1}{TND}\right)}\right),$$

wherein:

B represents a predefined lower bound;

$ND_j$ represents the number of records containing the neighbor element; and

TND represents the total number of records.

14. The computer-implemented process of claim 1, wherein step (d) comprises adding the context vectors of the information elements of the record.

15. The computer-implemented process of claim 1, wherein step (d) comprises the substeps of:
- (d.1) for a selected information element, generating a weight depending inversely on the frequency of occurrence of the information element in the training set of records;
- (d.2) for a selected information element, applying the weight to the context vector to generate an adjusted context vector; and
- (d.3) adding the adjusted context vectors of the information elements of the record.

16. The computer-implemented process of claim 1, further comprising the step of normalizing the summary vector for each record.

17. The computer-implemented process of claim 1, wherein step (e) comprises storing the determined summary vectors using convergent k-means clustering.

18. The computer-implemented process of claim 17, wherein the step of storing using convergent k-means clustering comprises the substeps of:
- (e.1) initially partitioning the summary vectors into a plurality of clusters, each cluster containing at least one summary vector;
- (e.2) determining a centroid vector for each cluster;
- (e.3) for each summary vector, performing the steps of:
- (e.3.1) determining the distance between the summary vector and each centroid vector;
- (e.3.2) determining which centroid vector has the smallest distance to the summary vector;
- (e.3.3) responsive to the determined centroid vector not being associated with the cluster containing the summary vector, adjusting the contents of the clusters so that the cluster associated with the determined centroid contains the summary vector;
- (e.4) adjusting the centroid vectors for the clusters that have been adjusted; and
- (e.5) responsive to a stopping criterion not having been achieved, repeating steps (e.1) through (e.5).

19. The computer-implemented process of claim 1, wherein step (e) comprises storing the determined summary vectors using Kohonen self-organization with conscience.

20. The computer-implemented process of claim 1, further comprising the steps of:
- accepting a query from a user containing at least one query information element;
- determining a query context vector as a function of context vectors for each of the query information elements;
- comparing the query context vector with the summary vectors; and
- accumulating a list of summary vectors ranked according to the results the comparing step.

21. The computer-implemented process of claim 20, further comprising the step of retrieving a subset of summary vectors according to the results of the comparing step.

22. The computer-implemented process of claim 20, wherein the comparing step comprises the substep of performing a dot product operation with the query context vector and the summary vectors.

23. The computer-implemented process of claim 20, further comprising the steps of:
- accepting a signal from the user indicating which summary vectors are most relevant;
- determining a revised query context vector based on the accepted signal; and
- repeating the comparing and accumulating steps.

24. A system for generating a set of summary vectors, comprising:
- a storage device containing a training set of records, each record containing a plurality of information elements;
- an initial context vector generator, coupled to the storage device, for assigning to selected information elements in each record an initial context vector comprising solely a plurality of randomly generated component data values;
- an iterative training device, coupled to the storage device, for modifying the initial context vector of the selected information elements by a function of the context vectors of information elements within a selected proximity to the selected information element and a proximity constraint that varies a magnitude of the modification to the initial context vector;
- a vector combiner, coupled to the storage device, for combining the context vectors of the information elements of each record to determine a summary vector for the record and storing the determined summary vectors in the storage device.

25. The system of claim 24, wherein:
the records comprise documents; and
the information elements comprise words.

26. The system of claim 25, further comprising a preprocessor, coupled to the storage device, for removing stop-listed words from the documents, marking multiple-word phrases to be treated as single words, and converting words into word stems.

27. The system of claim 24, wherein the iterative training device comprises:
- a function providing a movable window that iteratively selects a target element and a plurality of neighbor elements proximate to the target elements;
- a proximity determiner that determines a proximity of each neighbor element to the target element;
- a co-importance determiner that determines the relative importance of the target element and each of the neighbor elements in the window; and
- a context vector modifier for modifying the context vector for the target element responsive to the results of the proximity determiner and the co-importance determiner for each neighbor element.

28. The system of claim 24, further comprising:
- an input device for accepting a query from a user;
- a query context vector determiner, coupled to the input device, for determining a query context vector;
- a comparator, coupled to the query context vector determiner, for comparing the query context vector with the context vectors of the records in the corpus; and
- a list generator, coupled to the comparator, for accumulating a list of records in the corpus ranked according to the results of the comparator.

29. A computer-implemented process of generating a dictionary of information elements each associated with a context vector for a database of records, each record containing at least one information element, each information element having a determinate proximity to other information elements, comprising the steps of:
- (a) selecting a plurality of information elements for including in the dictionary;
- (b) assigning to the selected information elements an initial context vector consisting solely of a plurality of randomly generated component data values;
- (c) for each selected information element being a target information element, iteratively modifying its context vector by the context vectors of neighbor information elements as a function of the proximity of the neighbor information elements to the target information element, the modified context vectors of the selected information elements forming the dictionary of context vectors.

30. The computer-implemented process of claim 29, wherein modifying the context vector of a target information element further comprises:
   (c.1) for each neighbor information element, modifying the context vector of the target information element by a function of:
      i) an error vector being the difference between the context vector of the target information element and the context vector of the neighbor information element; and,
      ii) a proximity constraint being a function of the relative co-importance of the target information element and the neighbor information element in the database of records.

31. The computer-implemented process of claim 30, further comprising determining the relative co-importance according to the relative importance of the target information element and the relative importance of the neighbor information element.

32. The computer-implemented process of claim 31, wherein determining the relative co-importance comprises:
   determining the relative importance of the target information element, inversely according to the frequency of occurrence of the target information element in the training set of records; and,
   determining the relative importance of the neighbor information element inversely according to the frequency of occurrence of the neighbor information element in the training set.

33. The computer-implemented process of claim 32, further comprising the substeps of:
   determining the relative importance of the target information element by the equation:

$$I_j = B + (1-B)\left(1 - \frac{\log\left(\frac{1}{ND_j}\right)}{\log\left(\frac{1}{TND}\right)}\right),$$

wherein:
   B represents a predefined lower bound;
   $ND_j$ represents the number of records containing the target information element; and
   TND represents the total number of records; and,
   determining the relative importance of the neighbor information element by the equation:

$$I_j = B + (1-B)\left(1 - \frac{\log\left(\frac{1}{ND_j}\right)}{\log\left(\frac{1}{TND}\right)}\right),$$

wherein:
   B represents a predefined lower bound;
   $ND_j$ represents the number of records containing the neighbor element; and,
   TND represents the total number of records.

34. The computer-implemented process of claim 29, further comprising::
   (d) for at least one record in the database:
      (d.1) for each information element in the record that matches an information element in the dictionary, obtaining a modified context vector associated with the matching information element in the dictionary as the context vector for the information element; and,
      (d.2) summing the obtained context vectors to produce a summary vector for the record.

35. The computer-implemented process of claim 29, wherein a proximity constraint varies a magnitude of the modification to the context vector of the target information element as a function of both the frequency of occurrence of the target information element and the frequency of the occurrence of each neighbor information element.

36. The computer implemented process of claim 29, wherein the proximity between information elements is a quantifiable value based on at least one of:
   a distance between the information elements;
   an orientation of an information element with respect to another information element;
   a frequency of occurrence of an information element relative to a frequency of occurrence another information element; and
   a temporal relationship between two or more information elements.

37. In a computer system including a storage device containing a plurality of records, each record containing a plurality of information elements, a computer readable memory for configuring and controlling a processor in the computer system to generate a dictionary of context vectors, the computer readable memory comprising:
   an initial context vector generator, coupled to the storage device, for assigning to selected information elements in each record an initial context vector comprising solely of a plurality of randomly generated component data values; and,
   an iterative training device, coupled to the storage device, for iteratively modifying the context vector of each selected information element, being a target information element, by the context vectors of neighbor information elements as a function of the proximity of the neighbor information element to the target information element, the modified context vectors of the selected information elements forming the dictionary of context vectors.

38. The computer readable memory of claim 37, wherein a proximity constraint varies a magnitude of the modification to the context vector of the target information element as a function of both the frequency of occurrence of the target information element and the frequency of the occurrence of each neighbor information element.

39. The computer readable memory of claim 37, further comprising:
   a vector combiner, coupled to the storage device, for combining the context vectors of the information elements of each record to determine a summary vector for the record, and for storing the determined summary vector of each record in the storage device.

* * * * *

UNITED STATES PATENT AND TRADEMARK OFFICE
CERTIFICATE OF CORRECTION

PATENT NO. :   5,619,709

DATED      :   April 8, 1997

INVENTOR(S):   William R. Caid and Pu Qing

It is certified that error appears in the above-identified patent and that said Letters Patent is hereby corrected as shown below:

On the title page, item [75],
    under Inventors, delete "Pu Oing" and insert --Pu Qing--.

Signed and Sealed this

Eighteenth Day of May, 1999

Attest:

Q. TODD DICKINSON

*Attesting Officer*    *Acting Commissioner of Patents and Trademarks*